(12) United States Patent
Narayanan et al.

(10) Patent No.: US 7,492,944 B2
(45) Date of Patent: *Feb. 17, 2009

(54) EXTRACTION AND TRACKING OF IMAGE REGIONS ARRANGED IN TIME SERIES

(75) Inventors: Ajith Kumar Narayanan, Singapore (SG); Alberto Tomita, Jr., Yokohama (JP); Takaaki Murao, Yokohama (JP); Tomio Echigo, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 185 days.

This patent is subject to a terminal disclaimer.

(21) Appl. No.: 11/457,829

(22) Filed: Jul. 17, 2006

(65) Prior Publication Data

US 2006/0280335 A1    Dec. 14, 2006

Related U.S. Application Data

(63) Continuation of application No. 09/950,878, filed on Sep. 12, 2001, now Pat. No. 7,251,364.

(30) Foreign Application Priority Data

Sep. 12, 2000  (JP) .............................. 2000-277013
Nov. 27, 2000  (SG) .............................. 200006973-2

(51) Int. Cl.
*G06K 9/34*    (2006.01)
*G06K 9/46*    (2006.01)

(52) U.S. Cl. ..................................... 382/180; 382/173

(58) Field of Classification Search ................. 382/103, 382/107, 162, 164, 165, 168, 172, 173, 178, 382/180, 181, 190, 218, 219, 220, 272, 276, 382/288; 358/515, 530
See application file for complete search history.

(56) References Cited

U.S. PATENT DOCUMENTS

| | | | |
|---|---|---|---|
| 6,516,092 B1 * | 2/2003 | Bachelder et al. | 382/181 |
| 6,674,877 B1 * | 1/2004 | Jojic et al. | 382/103 |
| 6,766,037 B1 * | 7/2004 | Le et al. | 382/107 |
| 6,778,698 B1 * | 8/2004 | Prakash et al. | 382/164 |
| 6,788,814 B1 * | 9/2004 | Krtolica | 382/173 |
| 6,944,332 B1 * | 9/2005 | Brechner | 382/165 |
| 6,973,212 B2 * | 12/2005 | Boykov et al. | 382/173 |
| 7,003,135 B2 * | 2/2006 | Hsieh et al. | 382/103 |

\* cited by examiner

*Primary Examiner*—Amir Alavi
(74) *Attorney, Agent, or Firm*—Ido Tuchman; Lisa M. Yamonaco

(57) ABSTRACT

Methods and apparatus for effectively identifying the occlusion of objects, such as persons, having a high degree of freedom. In an example embodiment, after initialization, an image is input, and an image region is extracted from image data. The distance is employed that is obtained when the shape of a two-dimensional histogram in the color space is transformed into the feature space. A graph is formed by using the regions between the frames. A confidence factor is provided and image features are provided as weights to the edges that connect the nodes. Processing is performed and the confidence factor is examined. A connection judged less possible to be a path is removed. When there is only one available connection for the occlusion point, this connection is selected.

20 Claims, 20 Drawing Sheets

EXTRACTION AND TRACKING OF IMAGE REGIONS ARRANGED IN TIME SERIES

This application is a continuation of U.S. patent application Ser. No. 09/950,878 for EXTRACTION AND TRACKING OF IMAGE REGIONS ARRANGED IN TIME SERIES, filed Sep. 12, 2001 now U.S. Pat. No. 7,251,364, which claims priority under 35 U.S.C. § 119 to Japanese Patent Application No. 2000-277013 filed Sep. 12, 2000, the entire text of which is specifically incorporated by reference herein.

FIELD OF THE INVENTION

The present invention relates to an image processing method and an image processing system. In particular, the present invention relates to an image processing method and system that is effectively employed for a technique used for extracting a group of regions from image data, such as video image data, that are arranged in a time series, and for tracking the regions in the time series.

BACKGROUND

A demand exists for a technique to be used for defining an object in video, and for extracting and tracking a group of regions. With such a technique, each object could be used to describe a video sequence, and this could be used as a key for the automatic extraction of the definition of the video sequence.

For video content, a person tends to be treated as an important object, and for sports images and applications using a surveillance camera, almost all the objects may be expressed by extracting the region of a person. However, since a person enjoys a high degree of freedom, a fixed template that can effectively extract a region composed of a solid material can not be employed. Thus, region extraction is a difficult operation. Especially when multiple persons are passing each other, the person in front, nearer the camera hides the person behind. Thus, the separation of overlapping objects (called the occlusion state) is not easy.

When the occlusion state is resolved, it is necessary to extract and track regions while the previous state is maintained. However, since it is currently impossible to automate object extraction processing, the trajectories of objects that are automatically extracted must be corrected manually. For this processing, the discovery of an error in the result provided by the automatic process, and the correction of the error must be performed for each of the extracted objects. When ten persons on the average appear in video content, a total of ten corrections are required. And since the person performing the corrections must repeatedly view the same content, the costs involved are huge.

Thus, various object extraction and tracking methods have been proposed and discussed. For example, a method for extracting the image of a person from video content and tracking the image is described in "Pfinder: Real-Time Tracking of the Human Body", C. Wren, A. Azarbayejani, T. Darrell and A. Pentland, IEEE PAMI vol. 19, No. 7, pp. 780-785, July 1997" (document 1). In document 1, a background model is prepared using a Gaussian model, and segmentation is performed by using, as a reference, the Mahalanobis distance between the model and an input image. Further, a tracking method based on the prediction of motion using a Kalman filter is proposed.

A method that improves on the technique described in document 1 is disclosed in "Improved Tracking of Multiple Humans with Trajectory Prediction and Occlusion Modeling", R. Rosales and S. Sclaroff, Proc. CVPR '98" (document 2). According to this method, the motions of two persons are predicted using an extended Kalman filter, and the occlusion state, wherein the objects are overlapped, is identified.

Another technique is disclosed in "An Automatic Video Parser for TV Soccer Games", Y. Gong, C. Chuan and L. T. Sin, Proc. ACCV '95, vol. II, pp. 509-513 (document 3); "Soccer Player Recognition by Pixel Classification in a Hybrid Color Space", N. Vanderbroucke, L. Macaire and J. Postaire, Proc. SPIE, Vol. 3071, pp. 23-33, August 1997 (document 4); "Where are the Ball and Players? Soccer Game Analysis with Color-Based Tracking and Image Mosaick", Y. Seo, S. Choi, H. Kim and K. Hong, Proc. ICIAP '97, pp. 196-203 (document 5); and "CLICK-IT: Interactive Television Highlighter for Sports Action Replay", D. Rees, J. I. Agbinya, N. Stone, F. Chen, S. Seneviratne, M. deBurgh and A. Burch, Proc. ICPR '98, pp. 1484-1487 (document 6). According to this technique, based on histogram backprojection described in "Color Indexing", M. J. Swain and D. H. Ballard, IJCV, Vol. 7, No. 1, pp. 11-32, 1991 (document 7), a histogram to be tracked is entered in advance, and matching is performed in color space. For the determination of an occlusion, in document 5 the pixels in an occlusion are identified in RGB color space, and in document 4, the pixels are identified in hybrid color space. In document 6, color information is employed for tracking, and the motion prediction method is employed for the determination of an occlusion. As means for also handling information obtained in time space, a method is well known whereby a video sequence is analyzed in the spatio-temporal domain, and the surface of a tracking target. The obtained surface is tubular shaped, and an occlusion is determined based on the continuity along the time axis.

There is a well known technique for employing an interactive process (manual correction process) as a tracking method based on color information. That is, this is a technique whereby a user designates a tracking target, or tracks an object that corresponds to a shape or color (template) that has been entered in advance. For example, the technique for performing template matching based on information concerning the shape (sphere) and the color (white) of a soccer ball is described in "Analysis and Presentation of Soccer Highlights from Digital Video", D. Yow, B. Yeo, M. Yeung and B. Liu, Proc. ACCV '95. Further, the technique whereby a user employs a mouse to designate a player to be tracked in a soccer game is described in "Determining Motion of Non-Rigid Objects by Active Tubes", M. Takahata, M. Imai and S. Tsuji, Proc. ICPR '92, pp. 647-650, September, 1992.

However, the technique in document 1 can not extract the images of multiple persons from a video image and determine an occlusion. While in document 2, the technique for tracking two or more persons is not disclosed. Further, according to the methods in documents 3 to 6, only the information obtained in image space and color space is processed, and since the method that uses time space is based on the optimization process for the energy function, the calculation cost is high.

That is, although it is extremely common for two or more persons to appear and to overlap each other in a video image, the conventional techniques can not determine an occlusion. To improve on the conventional techniques, not only the information obtained in image space and in color space, but also the information obtained in time space must be employed. However, the cost of performing the required calculations is high, and to perform real-time tracking at a low cost is difficult.

Further, since currently it is difficult to perform the completely automated determination and tracking of an occlusion state, an interactive process is indispensable. However, it has been requested that means be found to simplify the interactive process, and to reduce the amount of manual labor and the operating time that is required.

SUMMARY OF THE INVENTION

It is, therefore, one aspect of the present invention to provide a method whereby it is possible to effectively identify an occlusion of objects, such as persons, having a high degree of freedom.

It is another aspect of the present invention to provide a method for identifying an occlusion without a high calculation cost being required.

It is an additional aspect of the invention to simplify the interactive process and to reduce the amount of manual labor, the operating time and the operating load. Thus the invention provide methods and apparatus for effectively identifying the occlusion of objects, such as persons, having a high degree of freedom. In an example embodiment, after initialization (step 1), an image is input (step 2), and an image region is extracted from image data by separating the foreground of the image from the background (step 4). For extraction of the image region, the distance can be employed that is obtained when the shape of a two-dimensional histogram in the color space is transformed into the feature space. While taking into account all the available connections of the extracted regions, a graph is formed by using, as nodes, the regions between the frames (step 5). The change value of a confidence factor can be provided for the node, and the image features in the color space and the real space can be provided as weights to the edges that connect the nodes. The graph processing is then performed (step 6). In this processing, the path search is performed for the paths of the graph, the confidence factor is examined, and the connection that is judged as less possible to be a path is removed. Further, the branching node is detected and marked as an occlusion. When there is only one available connection for the occlusion point, this connection is selected. When there are multiple connection choices, a screen is displayed to request the user for the selection of the connection.

BRIEF DESCRIPTION OF THE DRAWINGS

These and other aspects, features, and advantages of the present invention will become apparent upon further consideration of the following detailed description of the invention when read in conjunction with the drawing figures, in which.

Figure 1:
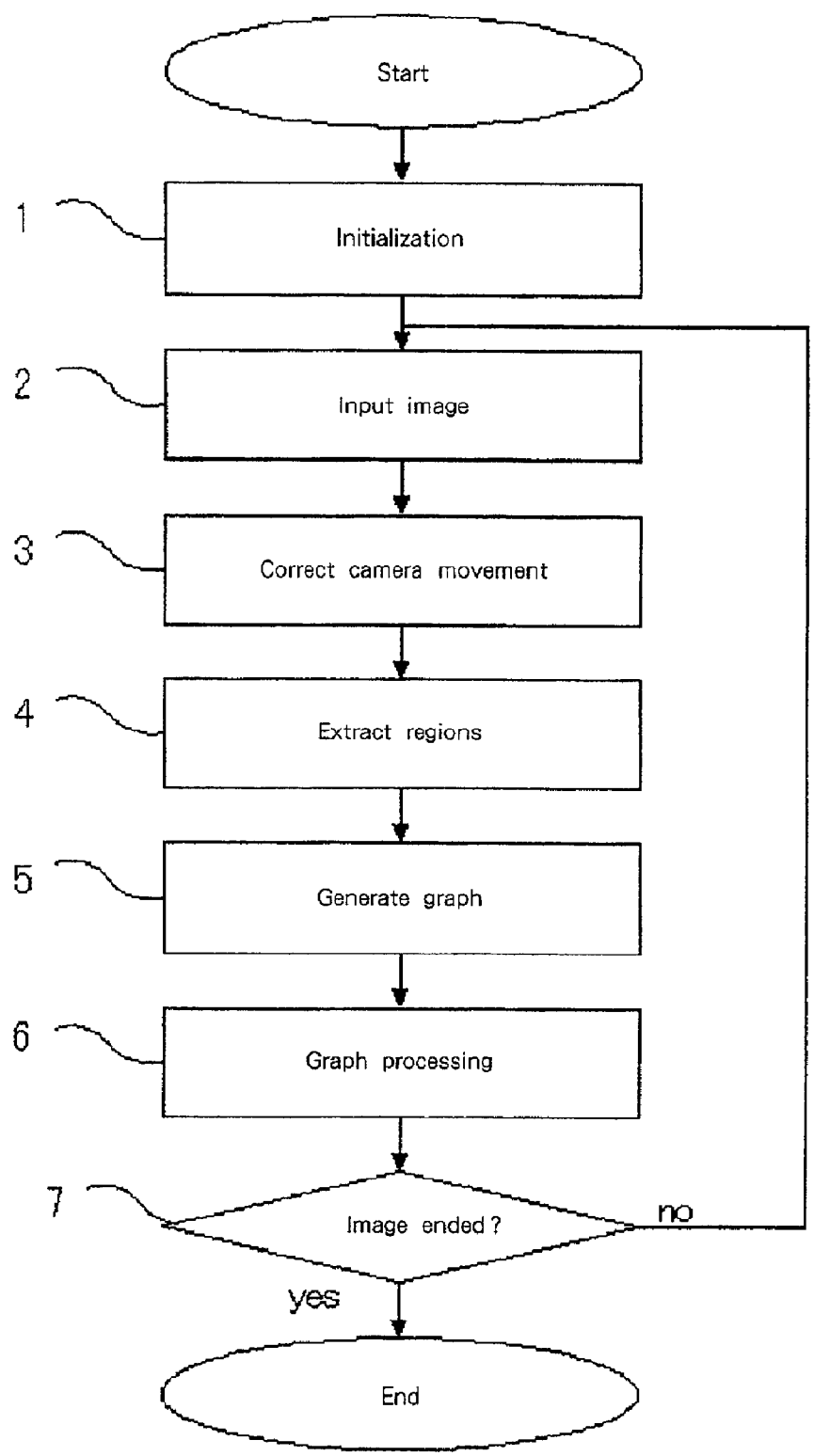
FIG. 1 is a flowchart showing the general image processing method according to the present invention.

DESCRIPTION OF THE SYMBOLS 1 to 64: Steps
A to G: Nodes

DETAILED DESCRIPTION OF THE INVENTION

According to the present invention, an image region is extracted from image data by separating the foreground of an image from the background. The distance whereat the shape of a two-dimensional histogram in color space is converted into a feature space can be employed to extract the image region. While taking into account all the available connections of extracted regions, a graph is prepared while using the regions between frames as nodes. The change value of a confidence factor can be provided for each node, and the image features in color space and in real space can be provided as a weight for the edge that connects the nodes. The path of the graph is searched for, and connections that are probably not used as paths are eliminated based on the path confidence factor. Further, a branching node is detected as an occlusion, and is marked. When there is only one choice for the connection of occlusions, that connection is selected. When there are multiple available connections, a screen is displayed requesting that a user select a connection.

As is described above, the path of the object is evaluated in accordance with the image features, such as the consistency of the locations of the image regions in the time series, or the consistency of the color, and a connection that is less available as the path of the object is removed. Thus, the state for which the manual interactive process is required is automatically detected by the program, and the choices are presented to a user, so that the labor required for correction can be reduced.

The present invention can also be explained from another viewpoint. Specifically, according to the present invention, an image processing method comprises the steps of: receiving first image data among multiple sets of image data that are arranged in a time series; performing segmentation for pixels of the first image data; correlating a first node with a first image region obtained by the segmentation; receiving, among the multiple sets of image data, second image data that follows the first image data in the time series; performing segmentation for pixels of the second image data relative to an area obtained by growing the first image region; correlating a second node with a second image region obtained by the segmentation; and correlating the first node and the second node using edges, and generating a graph.

For the segmentation of the pixels of the image data, the Gaussian distribution function in color space is assigned a label, and a label that corresponds to the Gaussian distribution function that has the shortest Mahalanobis distance from the pixel in the color space is provided for the pixel. When these labels correspond, the pixels are classified as belonging to the same region, and the image region can be generated. The size and the gravity center of the image region, the minimum bounding box of the image region and another region feature of the image region can be calculated.

Further, when the image region is not generated by the segmentation of the image data, a temporary node having as a negative change value for a confidence factor can be generated. As a result, supplementation of a missing, required node can be accomplished.

For the preceding and succeeding nodes of the edge, the edge can be weighted by a function that includes a first term, which includes the average value of the absolute differences between the colors of the pixels that constitute the image region, and a second term, which provides a normalized region that overlaps the image regions of the preceding and succeeding nodes of the edge. Thus, the image consistency of the node can be evaluated.

In the graph processing, a branching node is searched for, and a list of paths before and after the branching node, which is a starting point, is generated for paths down to a predetermined depth. Then, paths in the list having the same terminal points are detected, and the confidence factors for these paths are evaluated. According to the evaluation, paths having confidence factors smaller than a predetermined confidence factor are deleted.

Or, in the graph processing, a branching node is searched for, and a list of paths before and after the branching node, which is a starting point, is generated for paths down to a predetermined depth. Then, a check is performed to determine whether there is a path on the list whose terminal point was not detected during the search down to the predetermined depth. When the determination is true, a branching path other than the path whose terminal point was not detected is deleted. When the determination is false, the confidence factor for each path on the list is evaluated, and paths other than the path having the greatest confidence factor can be deleted.

Through the graph processing, a small branch, such as a small loop generated by a noise, can be removed. The confidence factor for the path can be obtained by adding, for each node of the path, the product of the change value for the confidence factor provided for each node of the graph and the weight provided for the edge of the graph.

In the graph processing, the path search tree is generated by performing the path search in the graph. While traversing the path search tree from the root node, when there is only one child node, a path counterweight of 1 is generated for each node of the tree. When there are multiple child nodes, a path counterweight is generated for the nodes by dividing 1 by the number of child nodes. The path counterweights are then added together, and a path counter is generated for each node in the graph. Seasoning is performed for the path counter, and a node whose path counter weight exceeds one is searched for. A check is performed to determine whether the interval between adjacent nodes having corresponding path counters is equal to or less than a predetermined length. When the determination is true, the connection is evaluated for each available input/output path. When an input/output path is found that has a single significant connection, this can be connected. Thus, when the connection in the occlusion state can be automatically determined, the connection in the occlusion is automatically determined by the system, so that the load imposed on the user is reduced.

In the graph processing, a target node is obtained by the path search, and a check is performed to determine whether the target node is at the current depth. When the depth determination is true, the choice at the occlusion point is added to the choice list. When the depth determination is false, whether the length of the choice list exceeds a predetermined threshold value, and when the depth determination is true, the choice list is presented, and the length determination is false, the choice list is cleared, and the target node is added to the choice list, so that the current depth can be updated. Thus, only when it is really necessary is the user required to make a choice for the occlusion state. Therefore, since only when it is absolutely necessary must the user select one of the choices presented by the graphical user interface, the load imposed on the user is greatly reduced.

Advantageous Embodiment

An example embodiment of the present invention will now be described in detail while referring to the accompanying drawings. It should be noted, however, that the present invention is not limited to this embodiment, and that it can be implemented by a variety of different embodiments. The same reference numerals are used throughout to denote corresponding or identical components.

For this embodiment, the explanation given will be mainly for the method or the system of the invention; however, as will be apparent to one having ordinary skill in the art, the present invention can be provided not only as a method and a system but also as a storage medium on which a computer-readable program code can be stored. Therefore, the present invention can be implemented as hardware or software, or as a combination of the two. An example storage medium on which the program code can be recorded is an arbitrary computer-readable storage medium, such as a hard disk, a CD-ROM, an optical storage device or a magnetic storage device.

The computer system used for this embodiment comprises a central processing unit (CPU), a main memory (RAM (Random Access Memory)) and nonvolatile memory (ROM (Read Only Memory)), all of which are interconnected by a bus. In addition, a co-processor, an image accelerator, a cache memory and an input/output controller (I/O) may be connected to the bus. Further, an external storage device, a data input device, a display device and a communication controller are connected to the bus via an appropriate interface. Furthermore, this computer system can also include a hardware resource with which a computer system is generally equipped. An example external storage device can be a hard disk drive; however, the external storage device is not thereby limited, and may include a magneto-optical storage device, an optical storage device, or a semiconductor storage device, such as a flash memory. A read only storage device, such as a CD-ROM, that can be used only for reading data may be included as an external storage device when this storage device is used for the reading of data or a program. The data input device can be an input device, including a keyboard, or a pointing device, such as a mouse. The data input device can also include a voice input device. An example display device can be a CRT, a liquid crystal display device or a plasma display device. Further, the computer system can be an arbitrary type of computer, such as a personal computer, a workstation or a main frame computer.

The computer system of this embodiment can be used as a single computer system, or it can be used to establish a network for multiple computer systems. In this case, the Internet, a LAN or a WAN can be used for communication among the computer systems. A communication line used for this connection may be either a private line or a public network line.

When multiple computer systems are employed to carry out the present invention, the program used by each computer system may be recorded in another computer system. That is, a remote computer can perform distributed processing or can execute a part of the program used by the computer system. When an address is to be used to refer to a program stored in another computer system, a DNS, URL or IP address can be employed.

It should be noted that when remarks are made concerning the Internet, these remarks also apply to intranets and extranets. And that references to Internet access also refer to intranet and extranet accesses. The term "computer network" is used to describe both a network that can be accessed publicly and a network for which only private access is permitted.

0. Overall Processing

FIG. 1 is a flowchart showing the general image processing method according to the invention. As the beginning of the processing, the system performs the initialization process (step 1). Then, an image is input (step 2), and camera correction is performed (step 3). Subsequently, the segmentation process is performed for the image to generate a group of regions (step 4), and thereafter, a graph is generated (step 5). The graph processing is then performed (step 6), and whether or not the processing is required for another image is determined (step 7). If the image processing is necessary, the processing is repeated from step 2. But if the image processing is not necessary, it is terminated. The individual steps will now be specifically explained.

1. Initialization (Step 1)

Figure 2:
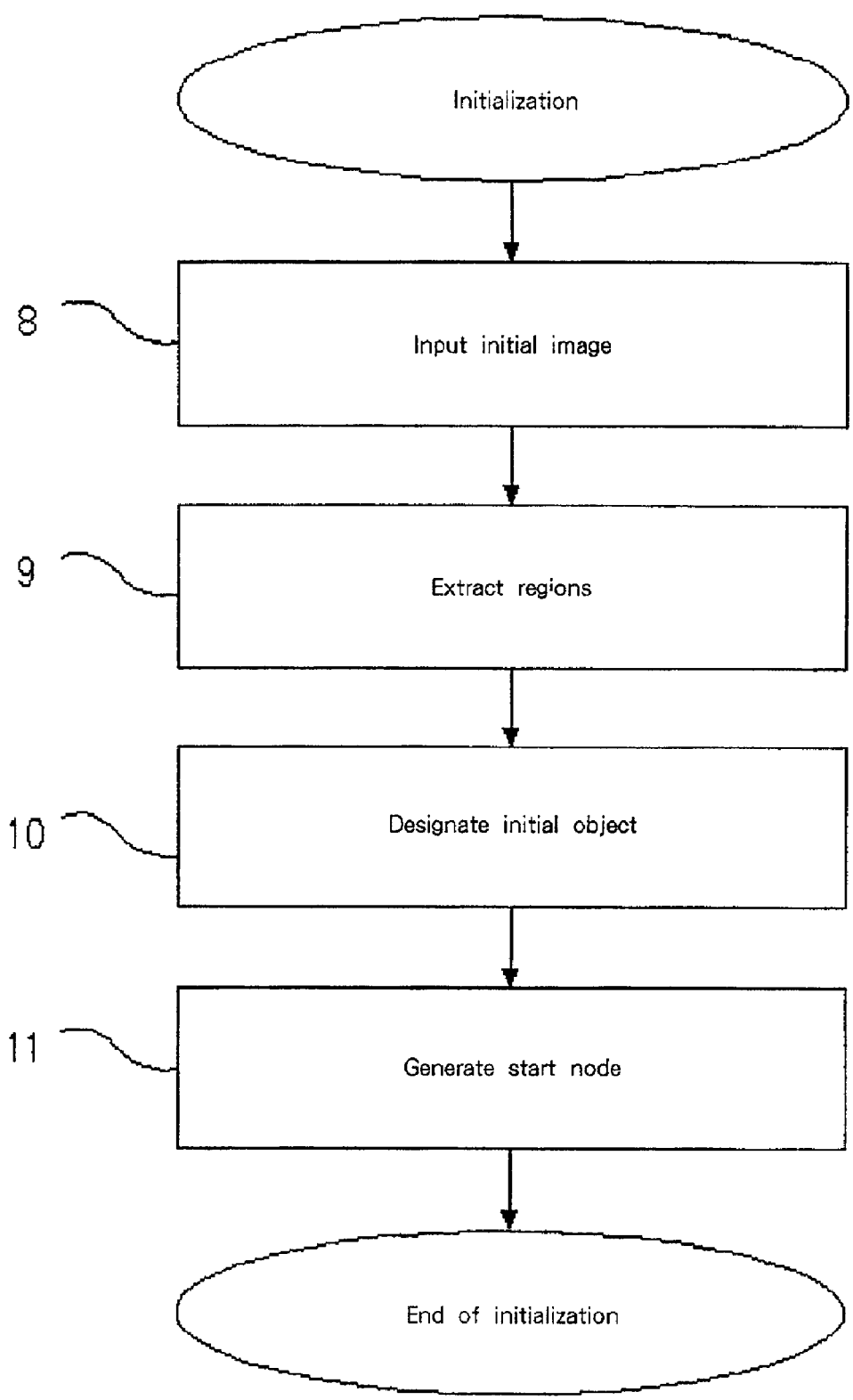
FIG. 2 is a flowchart showing example initialization processing.

FIG. 2 is a flowchart showing the initialization process. The following processing is performed. First, the first frame image is read (step 8), and the region for the first frame image is extracted (step 9). Then, a user designates the region for the initial object (step 10). Then, a node that is the starting point of a graph is generated (step 11).

The reading of a frame image (step 8) and the extraction of a region (step 9) are the same as steps 2 and 4, which will be described later. It should be noted that the target image for the region extraction is the overall frame image that is retrieved. A group of regions are extracted from the overall frame image by a region extraction process that will be described later. The designation of the initial object is a step of designating, from among the regions extracted at step 9, an object selected by the user, i.e., the object desired by the user for tracking. The designated object is used as a target for the tracking process that will be performed. The starting node is generated for the designated region (object) (step 11). The information for the region and the node, the information that will be described later, and information concerning the node are stored in a predetermined storage area of the computer system.

2. Image Input (Step 2)

A video image is used as an example input image for this embodiment. An input video image has, for example, 740× 480 pixels, 24 RGB bits and 30 frames per second. In this embodiment, because of the form of a video file, the processing target is not a frame, but a field (image data) of 740×240 pixels. The input data for which the present invention can be applied is not limited to video image data, however, and may be digital image data such as MPEG, etc., or image data having no specific standards. It should be noted that the image data must be arranged in a time series, and that the positions or colors of the objects included in the image data must be consistent, to a degree. The input image data are recorded in a predetermined storage area of a computer system.

3. Camera Movement Correction (Step 3)

In order to avoid the time fluctuation of the background of the image data, a video image is basically obtained by a fixed camera. When the camera is not fixed, the movement of the camera must be corrected. As a result of the correction, since the same image as obtained by the fixed camera can be obtained, the present invention can be applied. When the camera is moved, the video image can be corrected by using a conventional technique. For example, when a motion encoder is placed along the motion axis of the camera, the rotational distance for panning and tilting can be measured, and the coordinates of a pixel can be transformed using a geometrical model. When the image is obtained by a fixed camera and the background image is not displaced, naturally, the step of correcting the movement of the camera is not required.

4. Region Extraction (Step 4)

Figure 3:
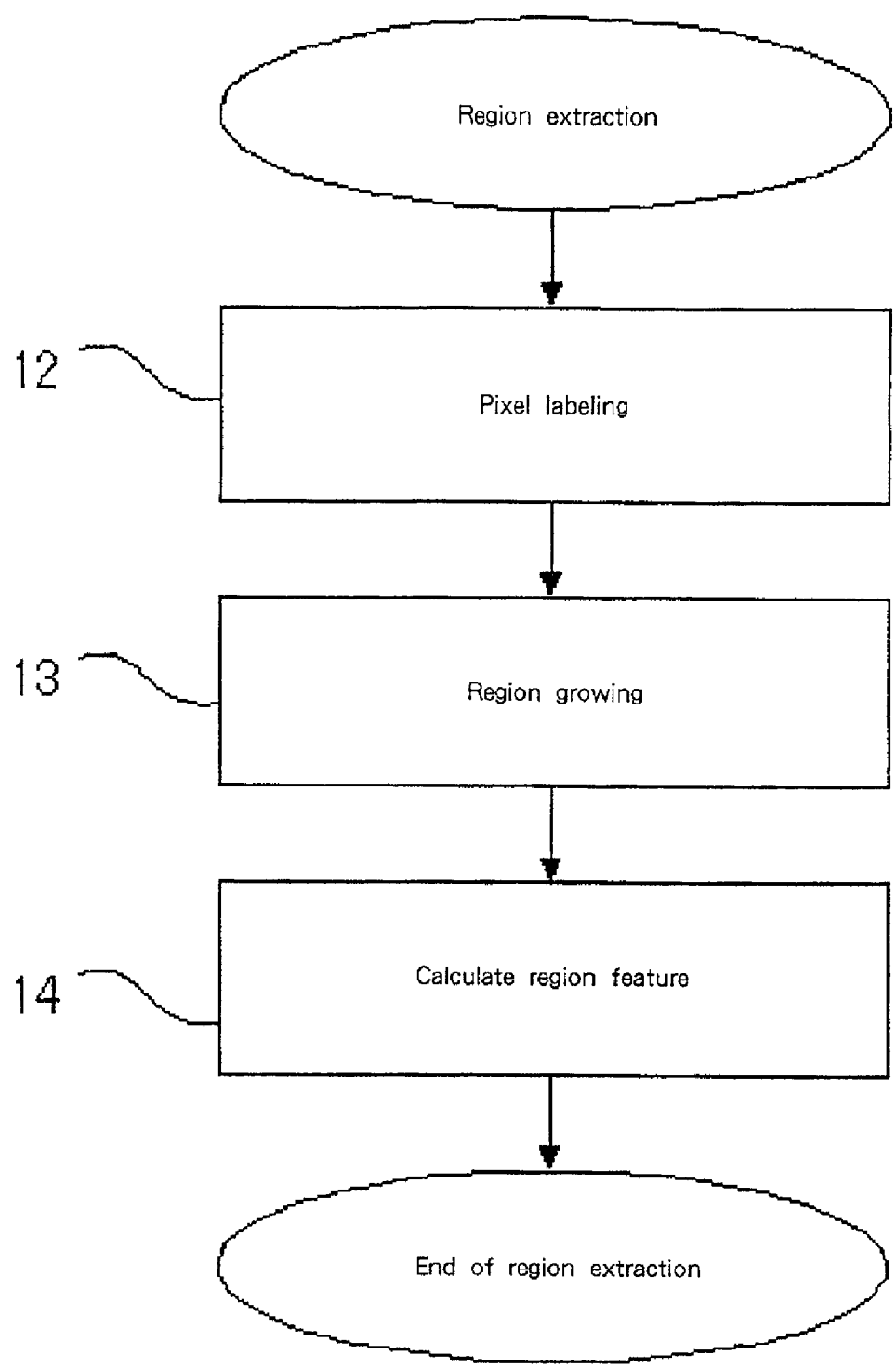
FIG. 3 is a flowchart showing example segmentation processing.

FIG. 3 is a flowchart showing an example segmentation process. A group of regions included in the object are extracted by the segmentation process. The segmentation process consists of three steps: pixel labeling (step 12), region growing (step 13), and region feature calculation (step 14).

(1) Labeling (Step 12)

A label is provided for each pixel in a target image (when a target region is limited for region extraction, each pixel in the target region). For example, for the video image of a soccer game, three labels, "background", "team A" and "team B", are prepared, and one of the labels is provided for each of the pixels in the target image. The distance between the color distribution model and the color space is employed as a method for determining the label to be provided for the pixel. The color distribution model corresponding to the label is defined, and the distance in the color space between the target pixel and the color distribution model is obtained. The label that corresponds to the color distribution model having the shortest distance from the target pixel is provided for the pertinent pixel. And the conventional Gaussian model, as represented in equation 1, can be employed as a color distribution model.

$$Pr(O) = \frac{\exp\left[-\frac{1}{2}(O-\mu)^T K^{-1}(O-\mu)\right]}{(2\pi)^{\frac{m}{2}}|K|^{\frac{1}{2}}} \qquad \text{[Equation 1]}$$

In the Gaussian model, samples of the regions "background", "team A" and "team B" can be manually cut out, and can be inserted as the center value (μ) of the color value (0).

The Mahalanobis distance represented in equation 2, for example, can be employed as the distance in color space.

$$dist = -\frac{1}{2}(x-\mu)^T K_1^{-1}(x-\mu) - \frac{1}{2}\ln(|K_1|) \quad \text{[Equation 2]}$$

As a result, the label is attached to all the pixels in the image.

(2) Region Growing (Step 13)

A region is prepared from a group of pixels having the same label. The label of a pixel is compared with the label of each of adjacent pixels in four directions. The same region number is provided for pixels having corresponding labels. Thus, a group of regions is generated for each region number.

(3) Calculation of Region Features (Step 14)

The side of the region can be obtained based on the number of pixels having the same region number. Further, the coordinates (x,y) of the center of gravity of the region and the minimum bounding box enclosing the region can be obtained. These region features can be employed for the generation and processing of a graph, which will be described later.

5. Graph Generation (Step 5)

When the region is defined as a node, an edge is extended between the nodes of two adjacent frames (image data) in a time series, based on the image feature in the color space, or the distance between the regions in real space. In this embodiment, there two types of edges are employed: the edge for the image feature in color space and the edge for the distance between the regions in real space. However, the edge type is not limited to these two, and an edge can be extended by using a characteristic value that represents the feature of the region (image). Further, the two types of edges need not always be employed together, and may be independently employed. The graph is formed by the node of the current frame, the node of the preceding frame and the edge that connects these nodes.

The change value for a confidence factor that represents the likelihood of the presence of an object can be provided for the node, and the weight relative to the confidence factor can be provided for the edge that is extended based on the image feature. The weight to be provided for the edge can be calculated using the image feature. The change value of the confidence factor is +1 for the common node.

Since sometimes in image processing the regions are extracted from the same object discontinuously at a distance equivalent to several frames, to resolve this, a temporary node having a predetermined length equivalent to several frames can be generated at the nodes that constitute the end point and the terminal point of the graph. The change value of the confidence factor of the temporary node is −1.

Further, for the region that during the region extraction process is determined to be overlapped by another player, the change value of the confidence factor is −0.5. Therefore, the weighting sum for the change values of the confidence factors along an arbitrary path in the graph can be obtained, and the confidence factor that represents the likelihood of an object being present on the path can be calculated.

Figure 4:
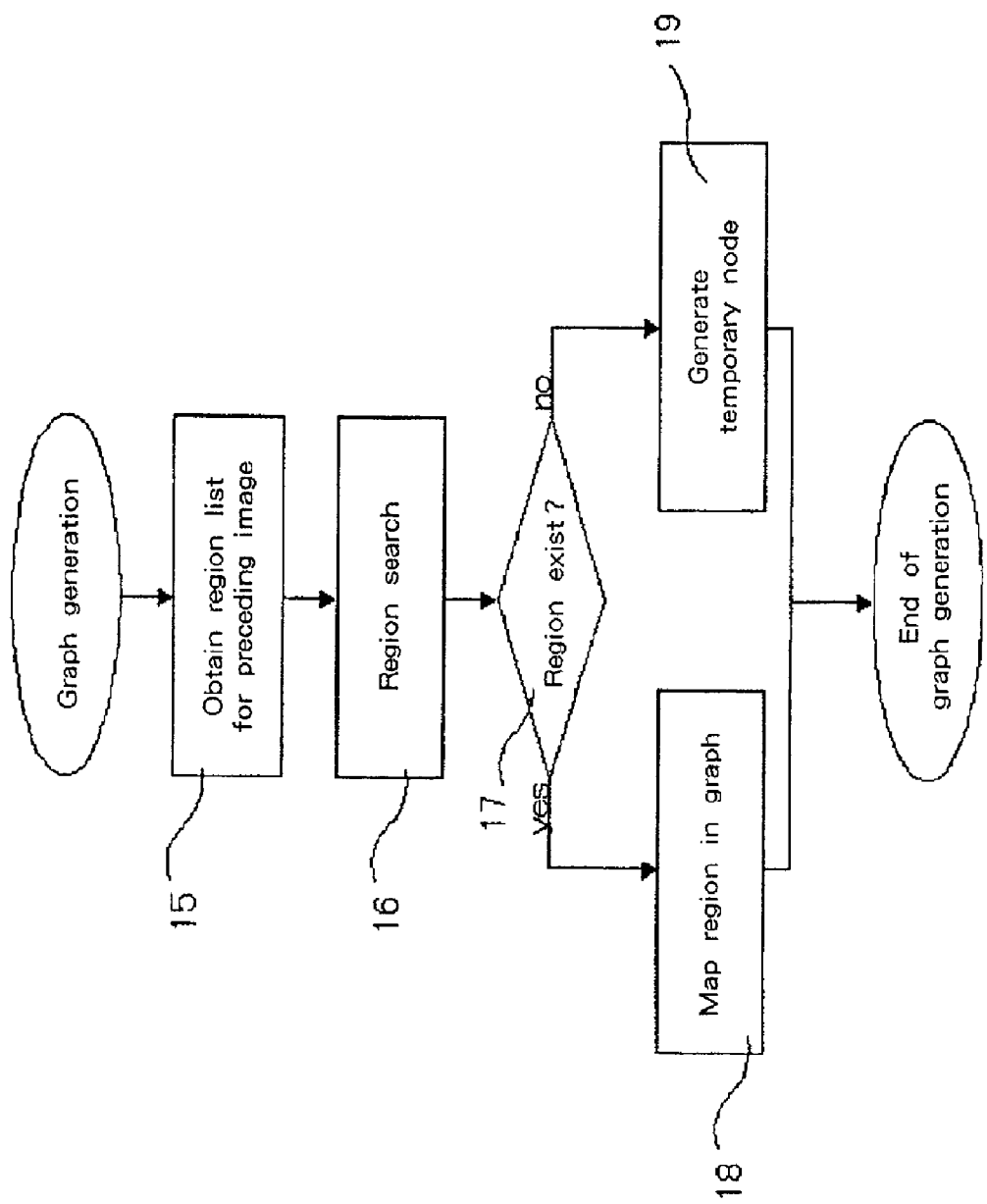
FIG. 4 is a flowchart showing example graph generation.

FIG. 4 is a flowchart for example graph generation. In the graph generation processing, first, a list of regions for a preceding image is obtained (step 15), and the regions for a current image are searched for (step 16). Not all the regions of the current image need be searched for, but the search is performed for an enlarged region at the portion (the minimum bounding box) that is identified as the region in the preceding image. The motion of the object is substantially continuous, and no large spatial motion occurs between the adjacent frames. Therefore, the search area for the region in the current image is limited to the vicinity wherein the region (object) of the preceding image was present. Thus, the calculation load and the calculation cost can be reduced.

A check is performed to determine whether the region has been detected as a result of the search of the current image (step 17). If the region has been detected, the region of the current image is defined as a current node, and the edge is extended between this node and the region (preceding node) of the preceding image. These regions are then mapped into the graph (step 18), and as described above, the edge is weighted.

The weight provided for the change value of the confidence factor of the edge based on the image feature can be determined in accordance with, for example, a mean absolute difference (MAD). An example MAD is represented in equation 3.

$$MAD_{(k,l)}(x,y) = \quad \text{[Equation 3]}$$
$$\frac{1}{MN}\sum_{i=0}^{M-1}\sum_{j=0}^{N-1}|F_n(k+i,l+j) - F_{n-1}(k+x+i,l+y+j)|$$

M and N denote the lengths of the sides of the image region obtained by the search, and x and y denote the spatial displacement between the preceding image and the current image. F denotes a function that indicates the color value with the pixel coordinates as a variable, and is used to obtain a difference (absolute value) in colors between n (the current image) and n−1 (the preceding image). It should be noted that a pixel is used as the unit for the spatial position, and an arbitrary scale can be used as the unit for the color. A MAD value of from 0 to 1.0 is set, and a MAD value for a similar color is set so it is closer to 1.0. Thus, when the MAD for the regions that are connected by the edge is employed, the weight Wc is represented as follows.

$$Wc = 1.0 - MAD$$

The weight provided for the change value of the confidence factor of the edge based on the positional relationship can be obtained by equation 4.

$$Wg = O(r_i, r_{i+1})/\min(s(r_i), s(r_{i+1})) \quad \text{[Equation 4]}$$

where $r_i$: a region on the region list of the preceding frame $r_{i+1}$: a region on the region list of the current frame $s(r_i)$: a function for obtaining the size of a region that is provided $o(r_i, r_{i+1})$: a function for obtaining an overlap in two provided regions min(a,b): a function for obtaining a smaller value between two scalar values that are provided.

When it is ascertained at step 17 that the region is not present, a temporary node is generated (step 19). By the generation of the temporary node, the path for the region wherein frames are discontinued by the noise can be filled. As is described above, when the temporary node is employed, the change value of the confidence factor is set to −1. And when the confidence factor change value is set to −1, and the temporary nodes are continued, the confidence factor is reduced as the evaluation for the path in the graph processing, and the path is deleted.

As is described above, when the edge extended between the nodes of the frames (images) is weighted using the distance in the color space or the real space, the consistency of the nodes can be featured in accordance with the image features of the nodes. In the following graph processing, the appropriateness of the path of the object can be evaluated, while taking into account the confidence factors of the nodes and the weight of the edge.

6. Graph Processing (Step 6)

Figure 5:
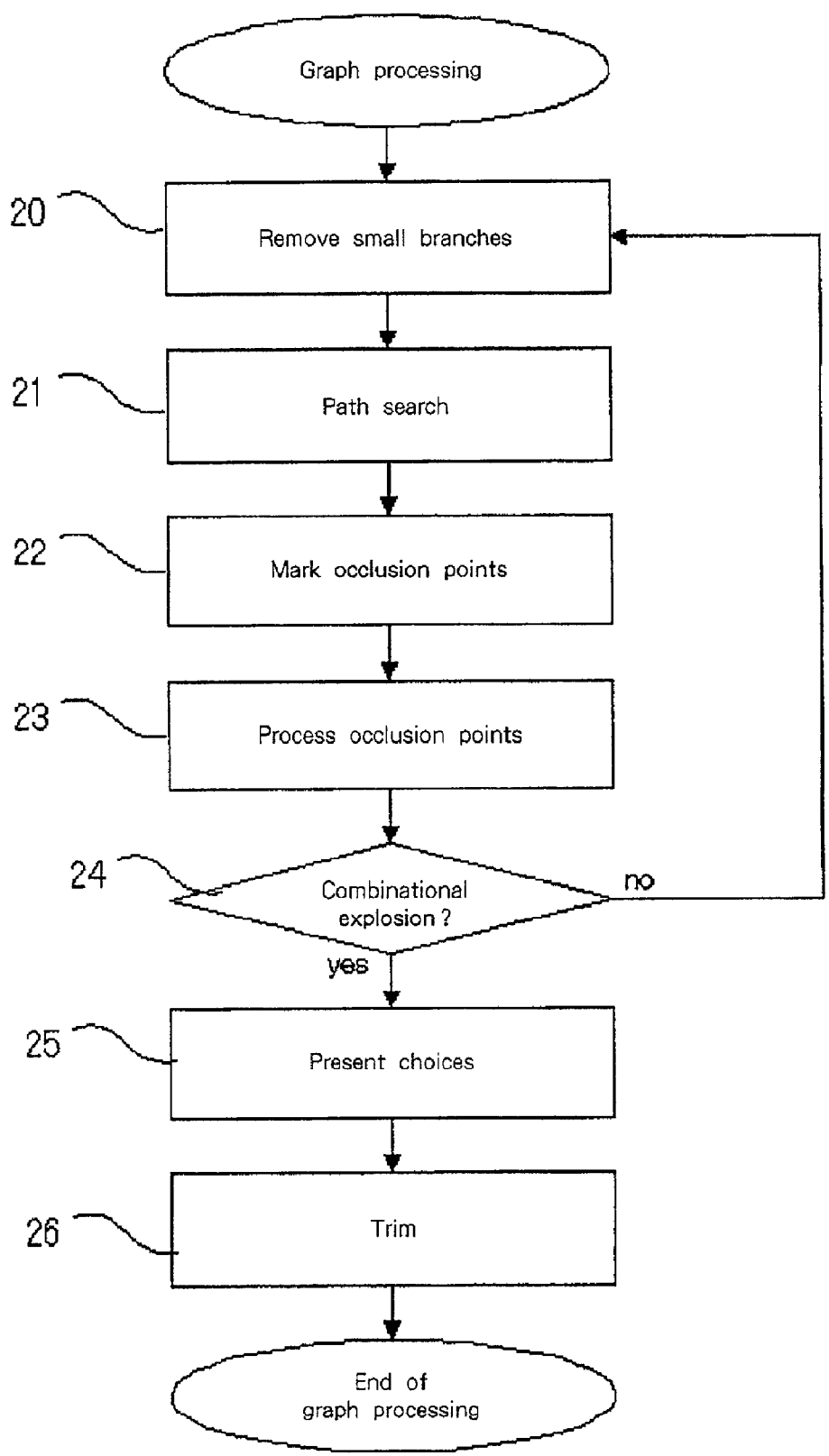
FIG. 5 is a flowchart showing example graph processing.

The path for the object is extracted from the graph prepared in the graph generation processing (step 5). FIG. 5 is a flowchart showing example graph processing.

First, small branches and small loops, which have been generated by noise that occurs near the object during the region extraction, are removed (step 20). During this process, an unnecessary path is deleted based on the evaluation of the likelihood that an object with the micro width will be present along the time direction.

The likelihood that an object will be a value that can be present along each path having an arbitrary length is calculated. For this calculation, the change value for the likelihood that the "object" for a node (an extracted region) will be present on the path, and the "weight" provided for the edge based on the image feature are employed. Therefore, only the image feature of each frame and the information for the frame in the vicinity need be used to extract the path. As a result, a path can be automatically extracted with fewer errors.

Then, the path of the object is searched for in the graph with the noise removed, and a path search tree is generated (step 21). The processing thereafter is managed using the path search tree.

Next, among the nodes that form the individual paths, the occlusion point is found while the phase of the graph is examined and marked (step 22). Occlusion means that multiple objects correspond to one node.

The occlusion point is processed (step 23). When the occlusion point is found and when the time whereat the occlusion occurred is considerably short, the path search tree can be trimmed based on the determination of the object correspondence. Thus, the interaction required of the user can be reduced.

When the number of portions whereat the path of an object can not be uniquely narrowed down is increased, these portions are detected (step 24), and are presented to the user before the choices are explosively increased, so that the user can make a selection (step 25). Since the detection of the portion whereat the selection by a user is required, and since the presentation of choices is automated, it is possible to reduce the load imposed on a user for an operation where conventionally he or she must confirm the tracking results for an object and corrects the path. Furthermore, the choices are so presented that the number is always close to a predetermined count. Therefore, even when the paths of the object cross each other like a mesh, the work efficiency is increased compared with when choices are presented for each branch. Finally, the trimming is performed upon the receipt of the instruction from the user (step 26). The individual steps of the above processing will now be described in detail.

6.1 Removal of Small Branches Generated by Noise (Step 20)

Figure 6:
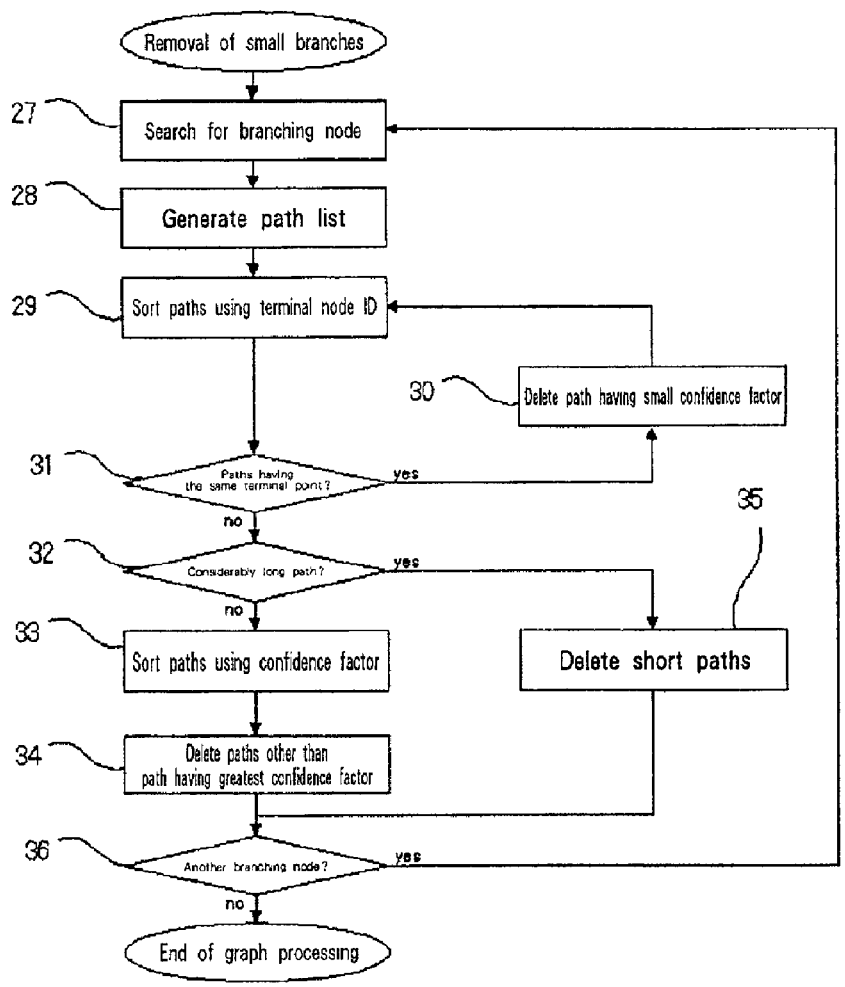
FIG. 6 is a flowchart showing example small branch removal process.

A search is performed to find paths, along the time axis originating at a branching node that constitutes a graph, having up to a predetermined length. Based on the likelihood of the object, from among the obtained paths, a path that is a part of the path of an object is maintained, and the other paths are deleted. FIG. 6 is a flowchart showing the small branch removal processing.

First, a branching node is searched for in the graph (step 27).

The graph is traversed down to a predetermined depth with the branch being used as the start point, and the list of paths from the start node to the preceding frame and the list of paths to the succeeding frame are generated (step 28).

These lists are sorted using the identification number (id) of the node that is the terminal point (step 29). At this time, it can be understood that the paths having the same terminal point constitute a small loop.

Therefore, the paths having the same terminal point are focused on. Based on the likelihood of the object, the path having the most likelihood of the object is maintained, and the other paths are deleted (step 30). The likelihood of the object is evaluated using the confidence factor of the path.

This process is repeated for the list of paths to the preceding frame and the list of paths to the succeeding frame, until there are no more paths having the same terminal point (step 31).

In accordance with the change of the confidence factor of the node in the graph and the weight of the image features (in the color space and the real space) of the edge, the confidence factor of the path is obtained, by equation 5, as the confidence factor of the node at the terminal end of the tree.

$$C_j = \sum_i w_i(c_i + c_{i+1})$$ [Equation 5]

where $C_j$: the confidence factor of the j-th path
$W_i$: the average value of $W_c$ and $W_g$
$W_c$: the weight provided for an edge based on the i-th image feature along the target path
$W_g$: the weight provided for an edge based on the i-th positional relationship
$C_i$ and $C_{i+1}$: the i-th image feature along the target path, and the change value of the confidence factor provided for the nodes at both ends of the edge in accordance with the positional relationship The list of the paths to the preceding frame and the list of the paths to the succeeding frame are examined to determine, as the result of the first search, whether there is a path (sufficiently long path) that did not reach the terminal end (step 32). If there is such a path, it is assumed that the likelihood of the object for this path is considerably high, and this path is maintained, and the other paths (short paths) are deleted (step 35). When a sufficiently long path is not found in both lists, the paths are sorted using the confidence factor (step 33), and the path having the greatest likelihood of the object (the greatest confidence factor) is maintained, while the other paths are deleted (step 34).

Thereafter, whether there is another branching node is determined (step 36). When there is another branching node, the above process is repeated. When there is no branching node, the processing is terminated.

Figure 7:
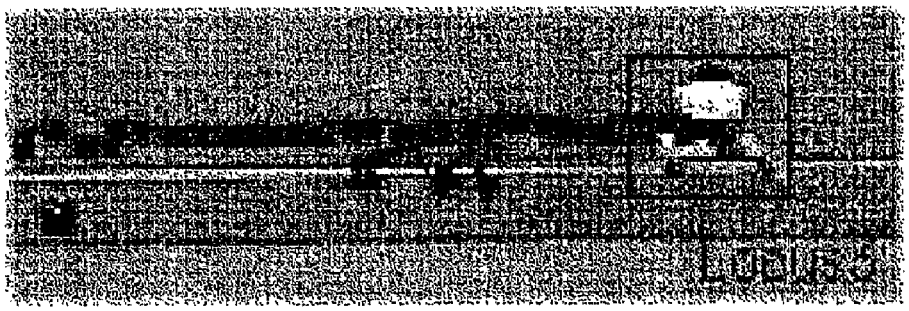
FIG. 7 is a diagram showing a sample image before small branches due to noise are removed.
Figure 8:
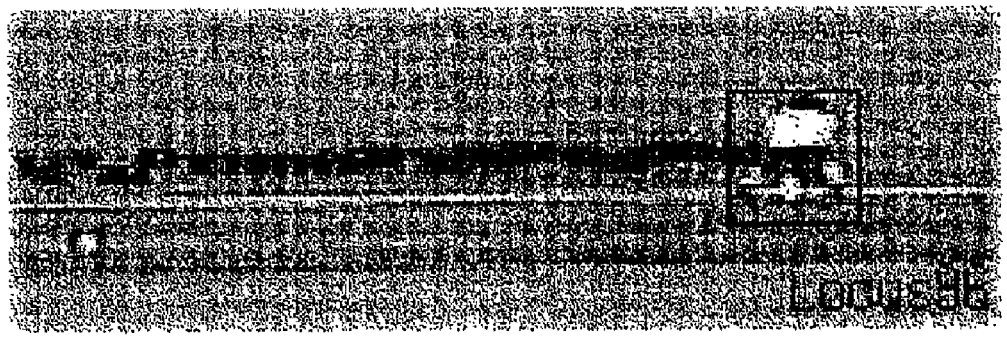
FIG. 8 is a diagram showing a sample image after small branches due to noise are removed.

A sample image before the removal of small branches, i.e., noise, is shown in FIG. 7, and a sample image after the removal of small branches is shown in FIG. 8.

6.2 Path Search (Step 21)

Figure 9:
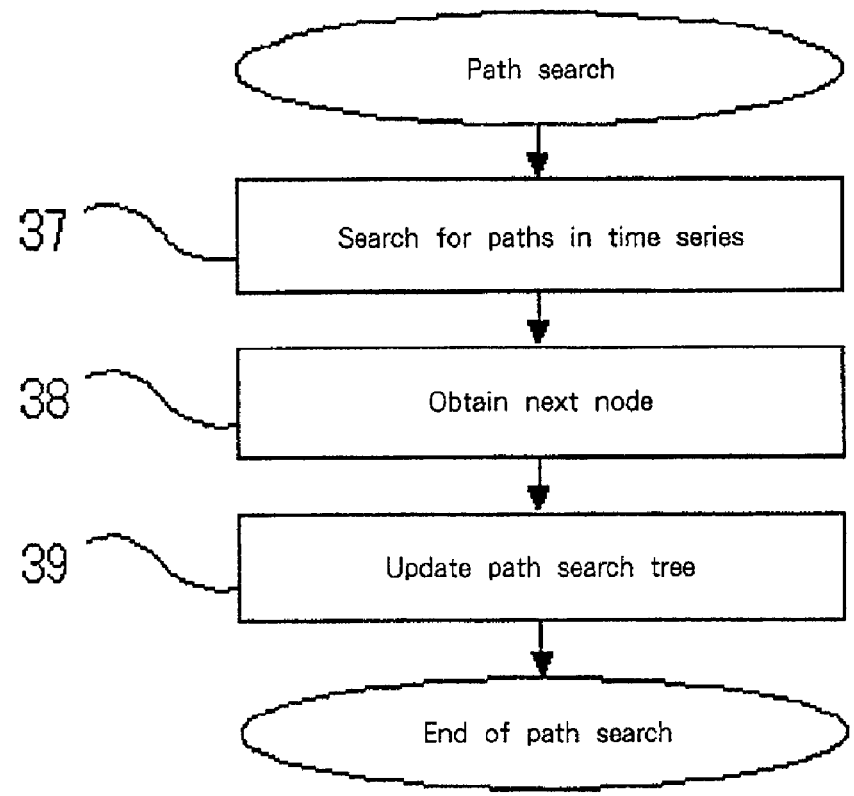
FIG. 9 is a flowchart showing example path search processing.

The "breadth-first" search (traverse) is performed for paths along which the nodes of the graph are tracked in time series. The paths are managed in a list for the terminal node of the search tree (hereinafter referred to as a path list). The "breadth-first" search is a well known method, and is carried out by, for example, a flowchart in FIG. 9 showing an example path search process. In FIG. 9, first, the path tree is traversed in time series (step 37), and the next node is obtained (step 38). Then, the path search tree is updated (step 39).

In the path search, the nodes between which two types of edges are extended are regarded as coupled nodes. When only one of the edges is extended between the nodes, these nodes are regarded as not coupled.

Figure 10:
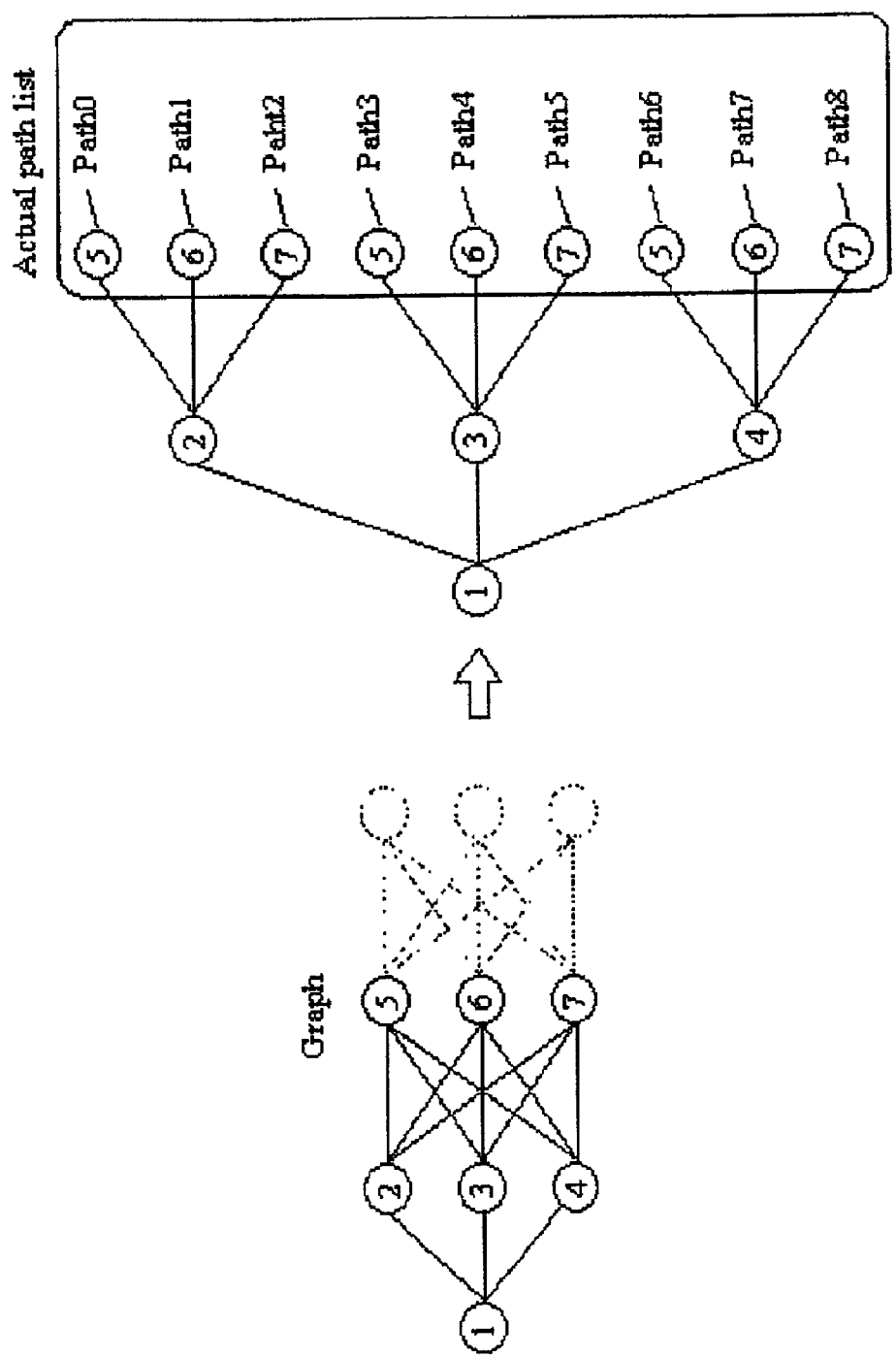
FIG. 10 is a diagram showing a graph and an example path search tree obtained by performing a path search in the graph.

FIG. 10 is a diagram showing an example path search tree (right side) obtained by traversing the graph shown on the left side in FIG. 10.

6.3 Marking of Occlusion Points (Step 22)

In the graph after the noise is removed at step 20, the graph is divided into the occlusion points, the non-occlusion points and points where an occlusion may have occurred, and these states are provided to the nodes of the graph.

Figure 11:
FIG. 11 is a diagram showing an example sample image where an occlusion occurs.

FIG. 11 is a diagram showing the sample image where an example occlusion appears. Three trajectories that are tracked cross each other at one point, and are then separated into three. An explanation will now be given for a method for determining the correspondence between the trajectory before the occlusion and the trajectory after the occlusion.

In the process for marking the occlusion points, the number of players (objects) that correspond to one node is obtained, and is provided as a path counter for the node. The portion where the path counter indicates 1 is defined as a portion where no occlusion occurs, the portion where the path counter indicates greater than 1 is defined as the portion where the occlusion occurs.

Figure 12:
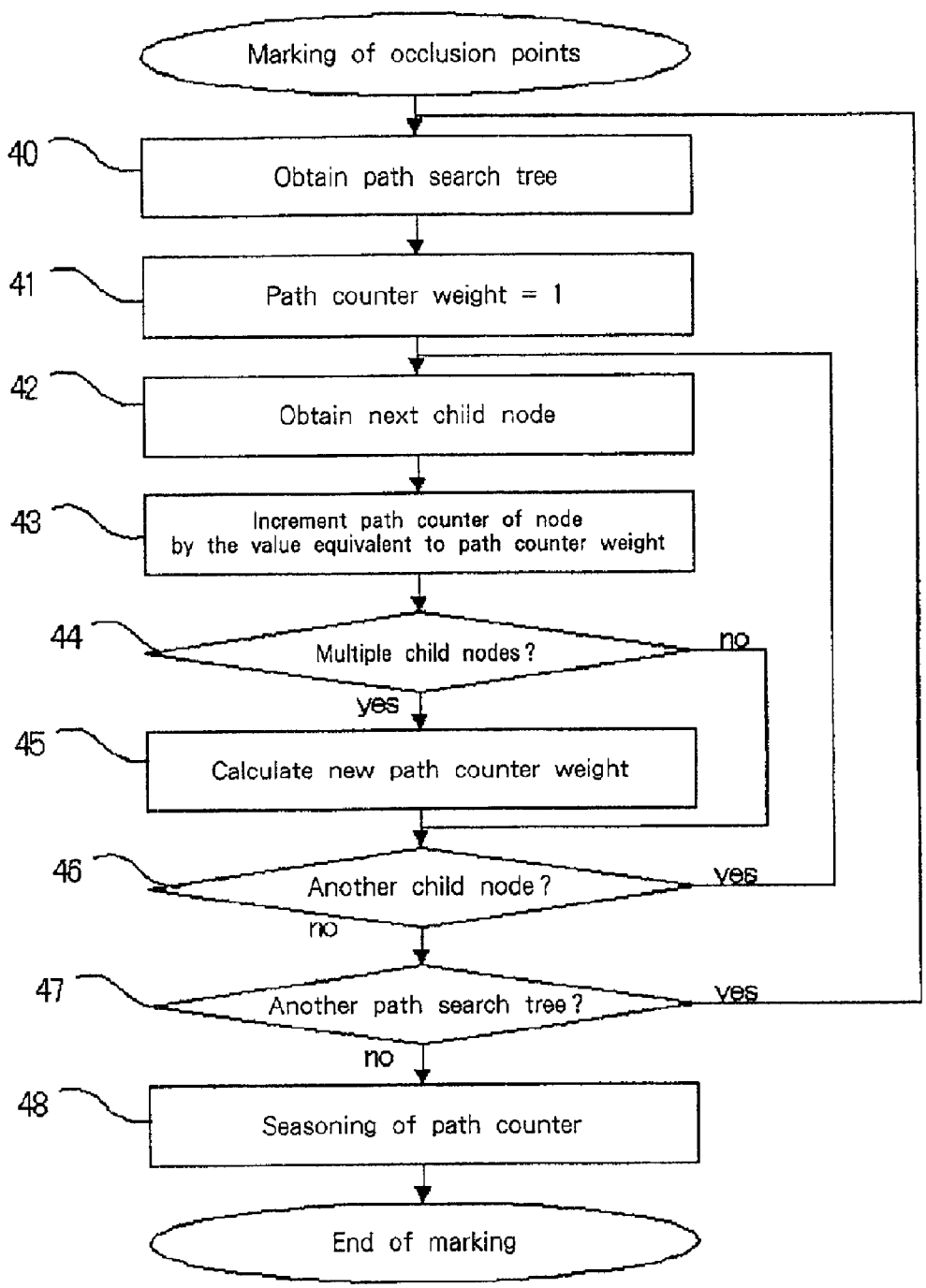
FIG. 12 is a flowchart showing an example process for marking occlusion points.

The path counter can be calculated by the method shown in FIG. 12. FIG. 12 is a flowchart showing the process for marking the occlusion point.

The path search tree is obtained in the path search process (step 21) (step 40). The path counter weight at the root of the tree is set to 1, the path is traversed (step 41). A child node for a specific node is obtained (step 42), and the path counter of the node is incremented by the value equivalent to the path counter weight (step 43). A check is performed to determine whether the node has multiple child nodes (step 44). When the node has multiple child nodes, the path counter weight is divided by the number of child nodes, and a new path counter weight is obtained (step 45). Further, a check is performed to determine whether a child node is present (step 46). When a child node is present, the process is repeated beginning at step 42. When a child node is not present, program control moves to step 47. The above processing is repeated for all the nodes in the path search tree, and the path counter weight is obtained for each node.

Specifically, while traversing all the path search trees, when multiple child nodes are present for a specific node, the path counter weight is divided by the number of the child nodes. The path counter weights for all the nodes of the tree are obtained, and are added to the path counters of the nodes of the graph. This processing is performed for all the path search trees.

Figure 13:
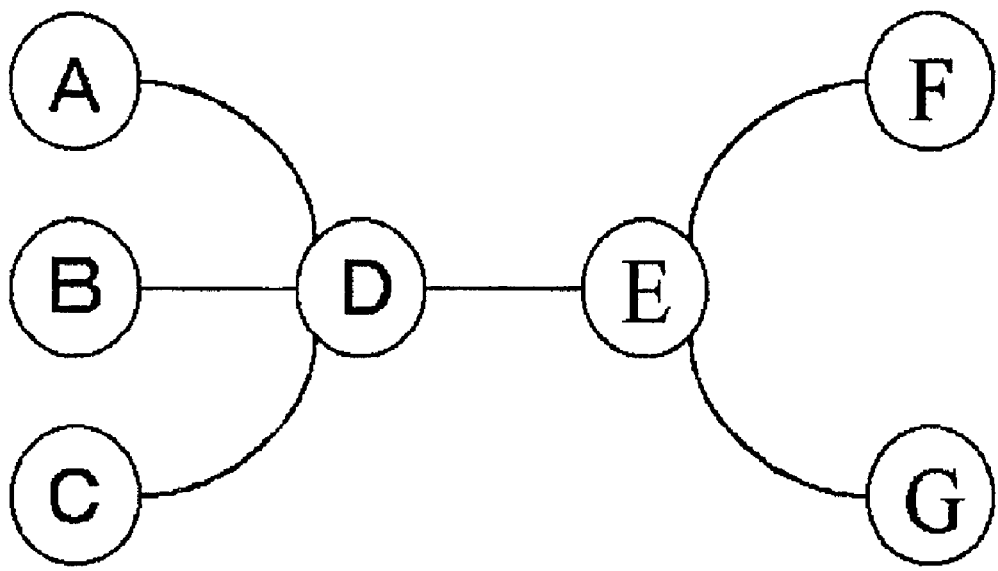
FIG. 13 is a graph for explaining path counters and path counter weights.
Figure 14:
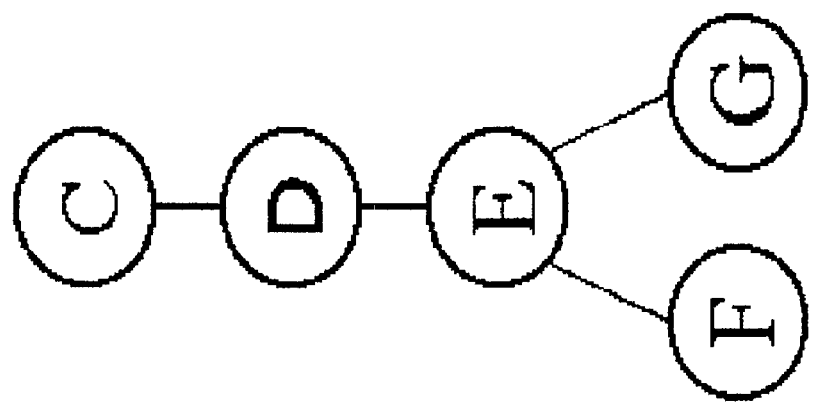
FIG. 14 is a diagram showing a path search tree for explaining the path counters and the path counter weights.
Figure 14:
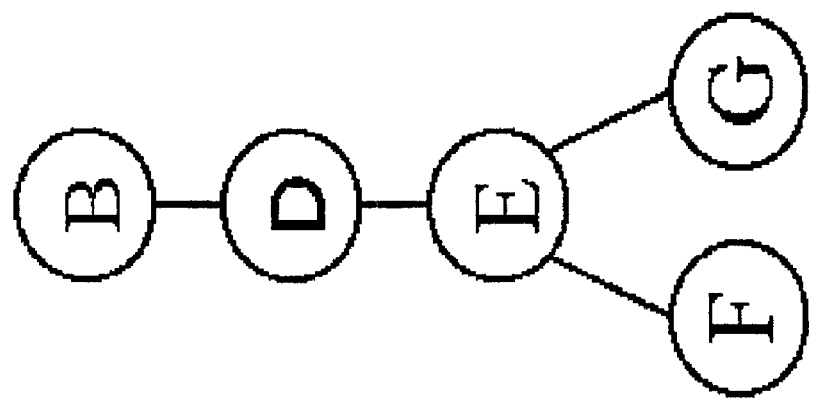
Figure 14:
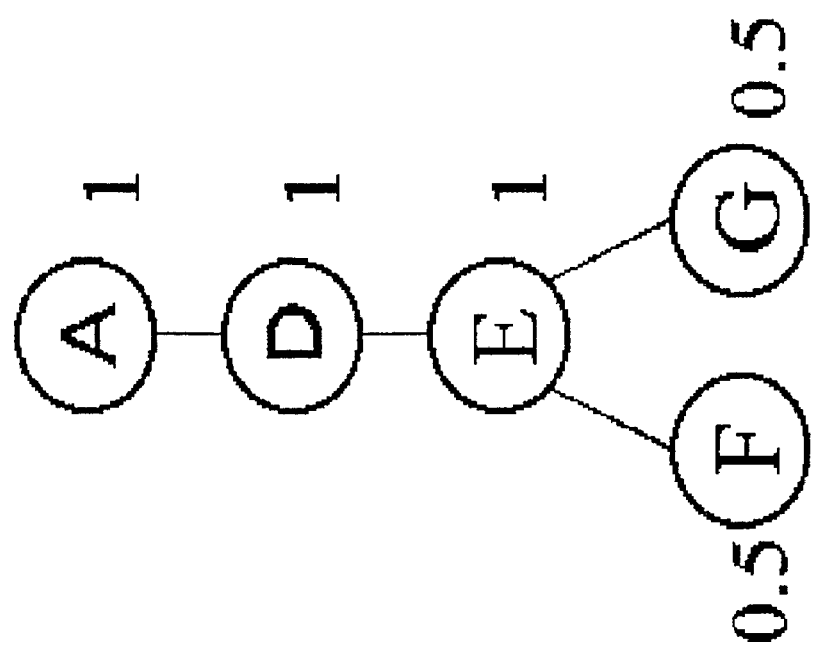
Figure 15:
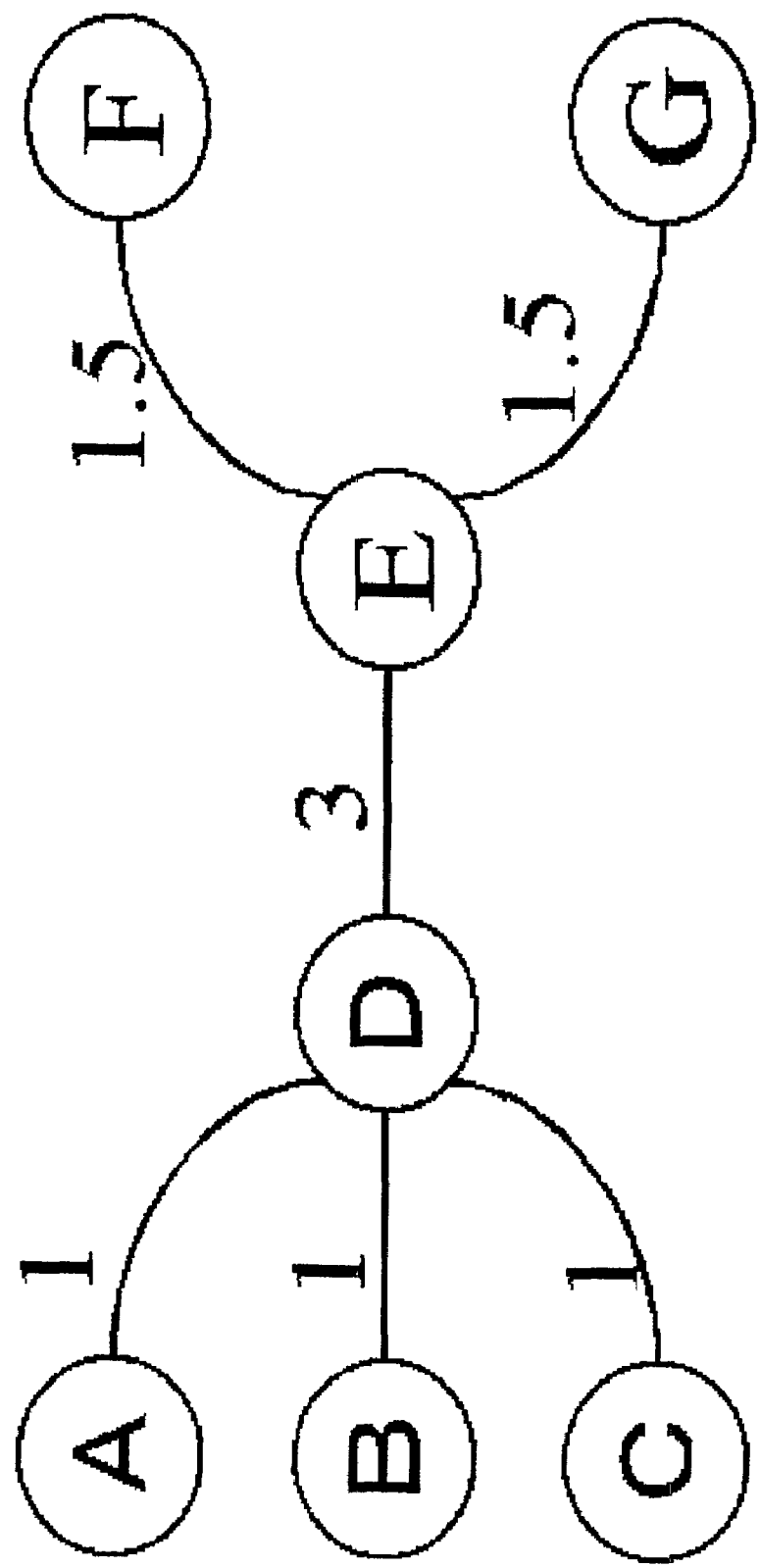
FIG. 15 is a graph for explaining the path counters and the path counter weights.

This processing will be further described while referring to FIGS. 13 to 15. FIGS. 13 to 15 are diagrams showing a graph or a path search tree for explaining a path counter or a path counter weight. For the graph in FIG. 13, the pertinent path search tree has nodes A, B and C as root nodes. The path search tree with the roots as start points is as shown in FIG. 14, and each node has a path counter weight shown in FIG. 14. With this path search tree, the path counters of the nodes in the graph have the values shown in FIG. 15.

Therefore, an occlusion does not occur at the intervals A-D, B-D and C-D for which the path counters are 1, an occlusion has occurred at the interval D-E, and an occlusion may have occurred at the intervals E-F and E-G.

Finally, when the path counter of the node that constitutes the graph is smaller than 1, seasoning is performed for the path counter (step 48). In the seasoning process, the overall path counter value is multiplied by the scalar times, so that the minimum counter value is 1.

Figure 16:
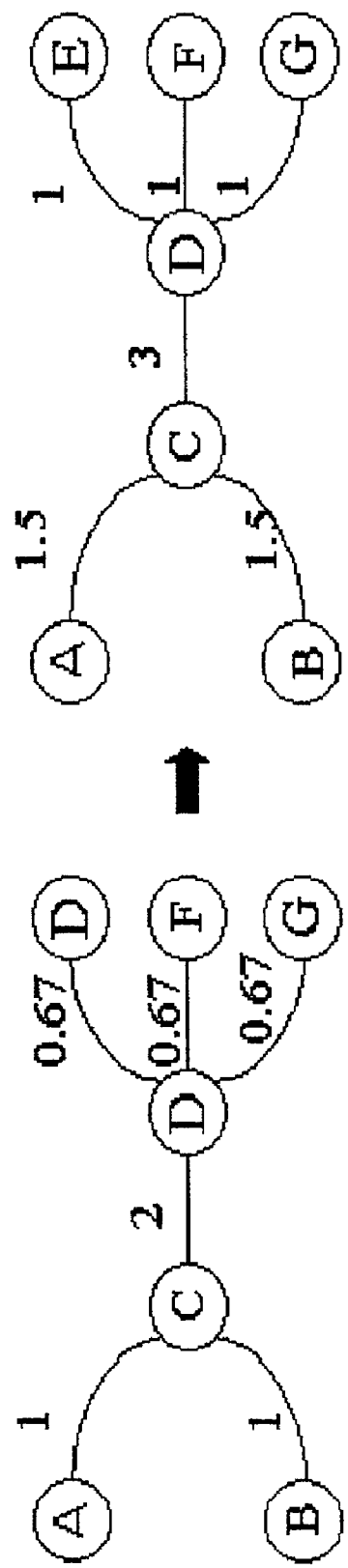
FIG. 16 is a graph for explaining seasoning for the path counters.

For the graph shown in FIG. 16, for example, since the minimum value of the path counter is 0.67, all the path counter is multiplied by 1.5.

6.4 Processing for the Occlusion Point (Step 23)

Figure 17:
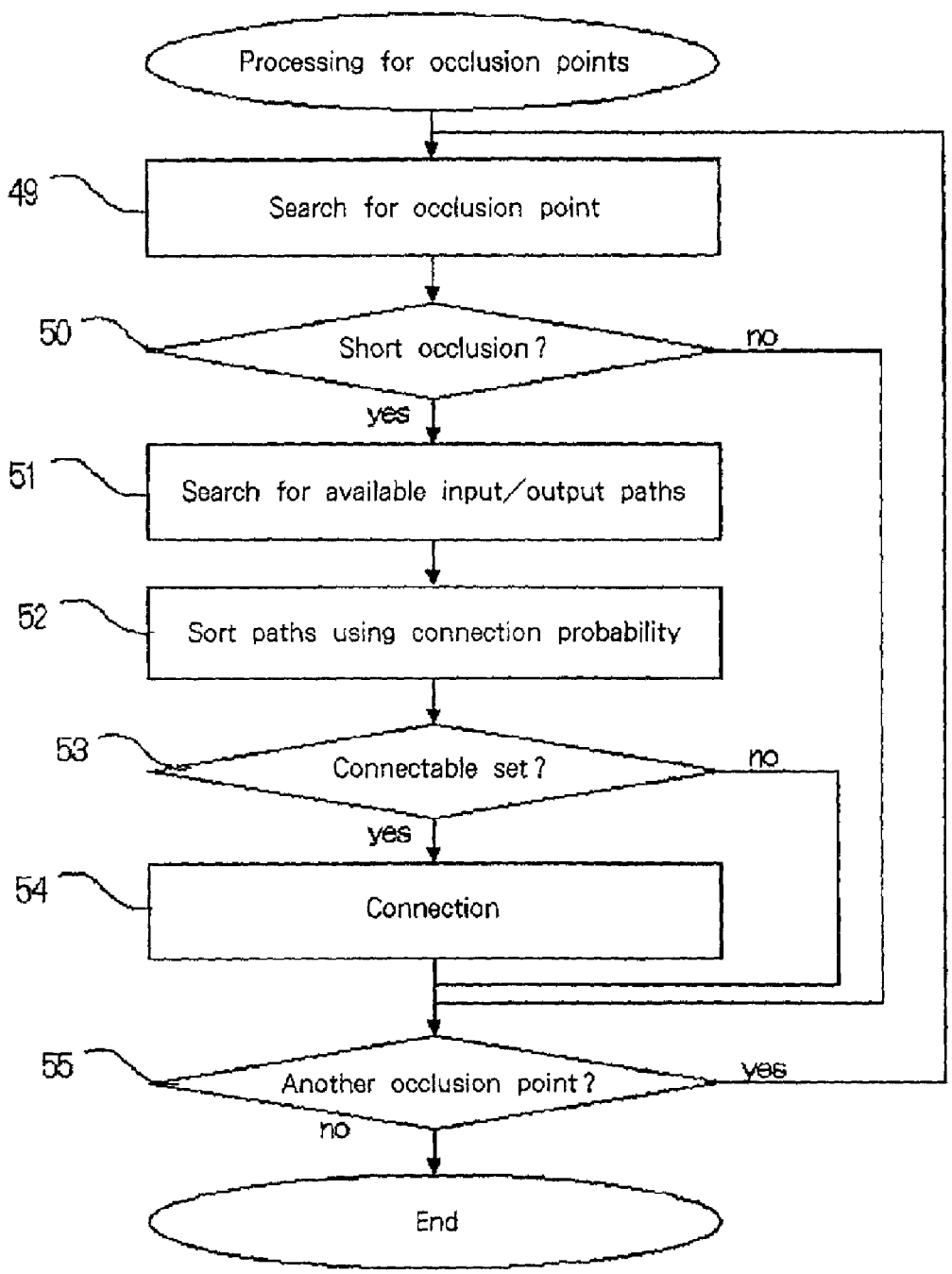
FIG. 17 is a flowchart showing example processing for occlusion points.

In the process (step 22) for marking the portion where the occlusion has occurred, a set of adjacent nodes having the same path counter is called an interval. When the path counter of the interval is not 1 (the interval where the occlusion has occurred) and when the interval is sandwiched by sufficiently short intervals, it can be expected that the paths are to be automatically re-connected before and after the occlusion interval. FIG. 17 is a flowchart showing example processing for the occlusion point.

The portions where the occlusion has occurred are searched for in the graphs (step 49), and the period where the occlusion appears is obtained for each occlusion. Among the extracted occlusion intervals, a considerably short interval that is sandwiched by sufficiently long intervals is defined as a short occlusion to be processed (step 50). All the available combinations of the paths input to the target occlusion and the paths output therefrom are calculated (step 51, and the sum of connections for these combinations is evaluated. To obtain the connection, as is represented by equation 6, the absolute value of a difference, in the average acceleration speed near the occlusion, between the intervals adjacent to the occlusion interval, or the absolute value of a difference in the average curvature, can be employed.

$$C_i = \left| \sum_j a_j - \sum_k a_k \right| \quad \text{[Equation 6]}$$

where $C_i$: the evaluation of a connection of the i–th combination $a_j$: an acceleration speed or a curvature for each node that is near an occlusion and along an input path for a target combination $a_k$: an acceleration speed or a curvature for each node that is near an occlusion and along an output path for a target combination The combinations of the input/output paths are sorted using the connection (step 52), and a check is performed to determine whether there is a combination having a more significant connection than the others (step 53). When there is a combination having a more significant connection, it is assumed that this combination is correct, and the occlusion is removed so as to connect these paths. Then, unnecessary branches are removed from the path search tree. This processing is performed for all the occlusion points (step 55).

In this example, the acceleration speed or the curvature is employed for the evaluation of the connection. However, the other means can be employed. For example, the average of the speeds before and after the occlusion, or the average value of the directions in which the object travels before and after the occlusions may be employed.

6.5 Determination of Combinational Explosion and Presentation of Choices (Steps 24 and 25)

The portion in a considerably long interval for which the path is not uniquely determined is examined to determine, in accordance with the length of the paths and the number of paths that are currently managed, whether the combinational explosion occurs in path choices.

The number of choices is apparent from the length l of the updated path list. Further, the portion in the considerably long interval for which the path is not uniquely determined can be identified in accordance with the relationship of the length l and depth d, which the depth of the path search tree at the pertinent portion.

When $1 \geq P_{max}$, choice explosion (combinational explosion) occurs, and when $1 < P_{max}$ and $d \geq D_{max}$, the path is not uniquely determined in a considerably long interval, where $P_{max}$ denotes the upper limit for the path choice, and $D_{max}$ denotes the upper limit of the length of the interval where multiple choices are permitted.

Figure 18:
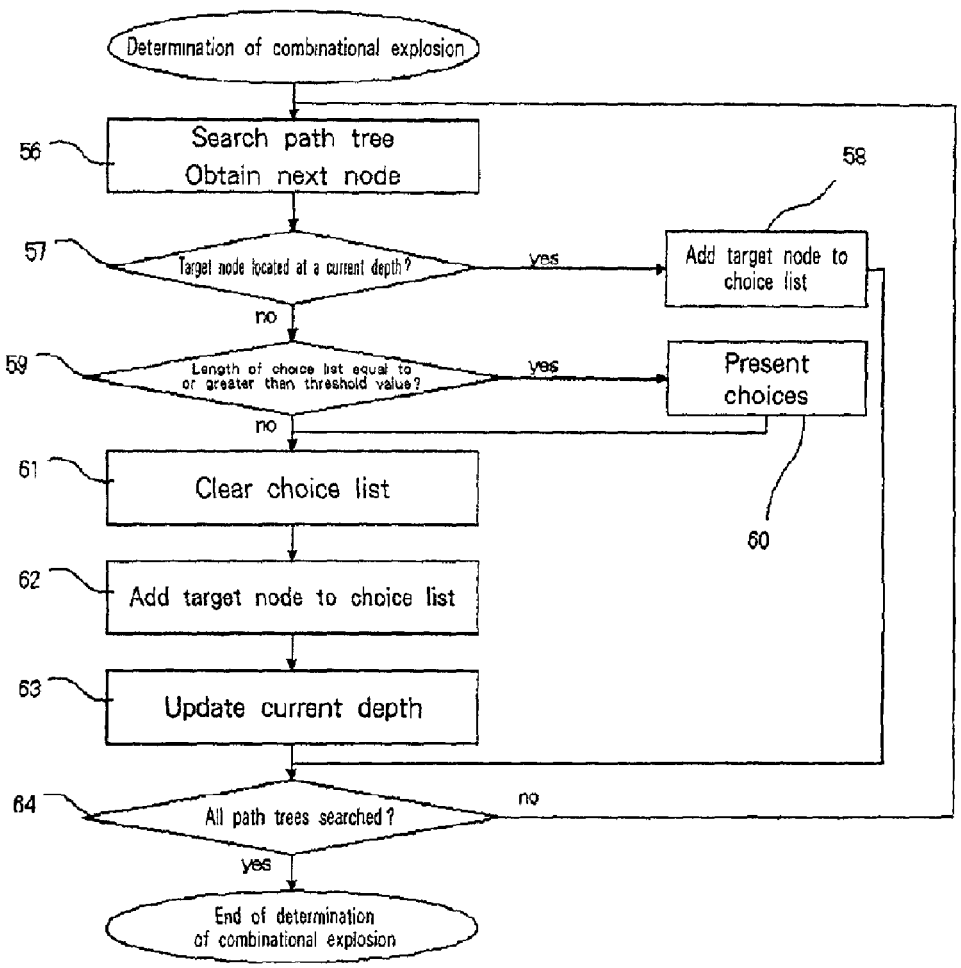
FIG. 18 is a flowchart showing example processing for determining a combinational explosion and for presenting choices.

When combinational explosion of choices may occur, available choices are presented to the user to request the selection of a correct path. When choices are not many, all the paths are presented at one time to request the selection. When choices are too many, available paths are presented, so that at most a predetermined number of choices are maintained for every several levels from the root of the path search tree. FIG. 18 is a flowchart showing example processing for determining the combinational explosion and for presenting choices.

The nodes are extracted while the "breadth-first" search is performed for the path search tree (step 56). A check is performed to determine whether the target node is located at the current depth of the path search tree (step 57). If so, the pertinent node is added to the list of choices (step 58). When the target node is not located at the current depth, a check is performed to determine whether the length of the current choice list exceeds a threshold value (step 59). If the length of the list exceeds the threshold value, the paths on the current choice list are presented to the user (step 60) to request the user to select the path. When the length of the list does not exceed the threshold value, the choice list is cleared (step 61), the target node is added to the choice list (step 62), and the current depth is updated (step 63). This process is performed for all the path trees, while the path tree is tracked by the "breadth-first" method (step 64).

The following methods are employed at step 60 to present choices.

Figure 19:
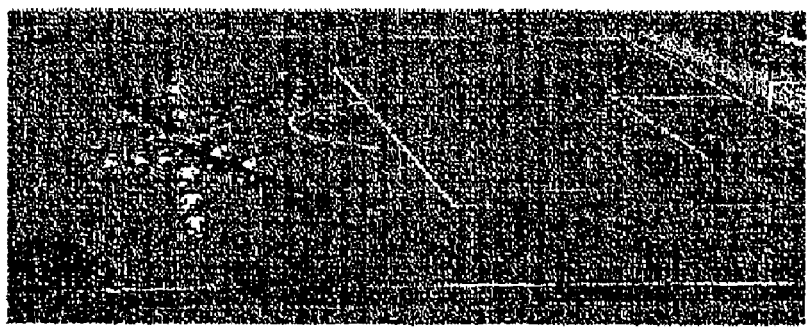
FIG. 19 is a diagram showing an example display screen for presenting choices to a user.

(1) The images of all the players that correspond to nodes on available paths are displayed at the same time, and the available paths are also displayed as choices. This example is shown in FIG. 19.

Figure 20:
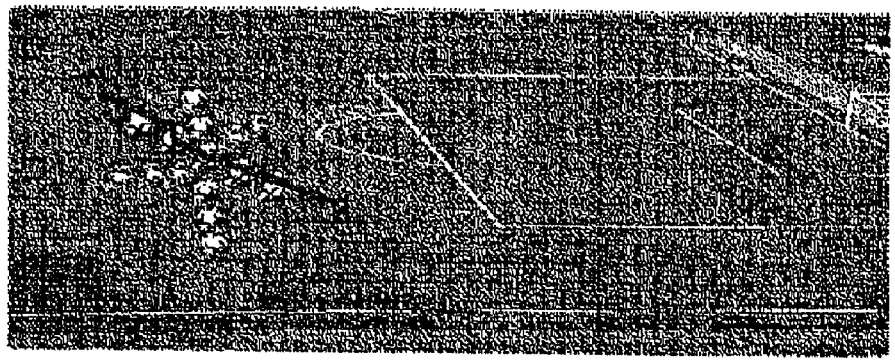
FIG. 20 is a diagram showing another example display screen for presenting choices to a user.

(2) The images of all the players that correspond to nodes on available paths are displayed at the same time, and the available paths are displayed sequentially. This example is shown in FIG. 20.

Figure 21:
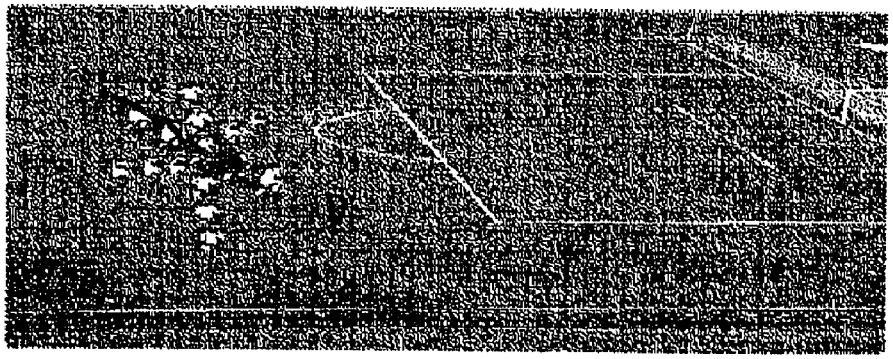
FIG. 21 is a diagram showing an additional example display screen for presenting choices to a user.

(3) The images of all the players that correspond to nodes on available paths are displayed at the same time, and the available paths are reproduced in time series and displayed. This example is shown in FIG. 21.

Figure 22:
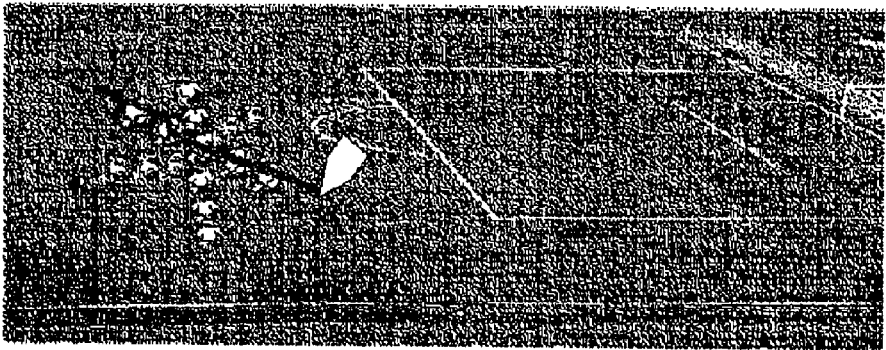
FIG. 22 is a diagram showing a further example display screen for presenting choices to a user.

(4) The images of all the players that correspond to nodes on available paths are displayed at the same time, and the user is permitted to track the path using a pointing device, such as a mouse, a pen or a touch panel. The choice that is closest to the input locus is defined as a path. This example is shown in FIG. 22.

Figure 23:
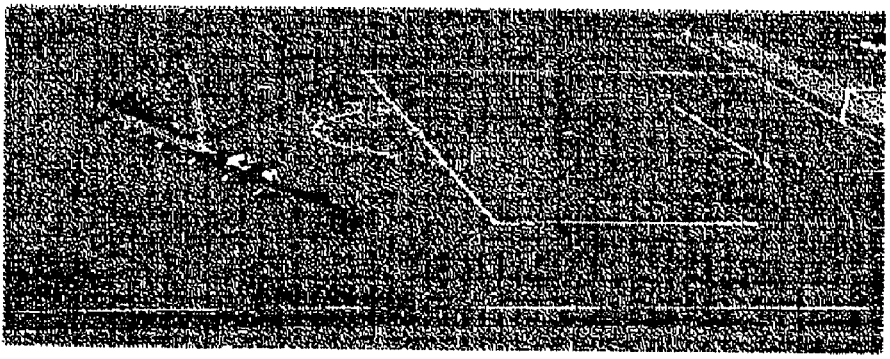
FIG. 23 is a diagram showing a still further example display screen for presenting choices to a user.

(5) Available paths are displayed at the same time, and the images of players that correspond to nodes on the individual available paths are displayed in order for each choice. This example is shown in FIG. 23.

Figure 24:
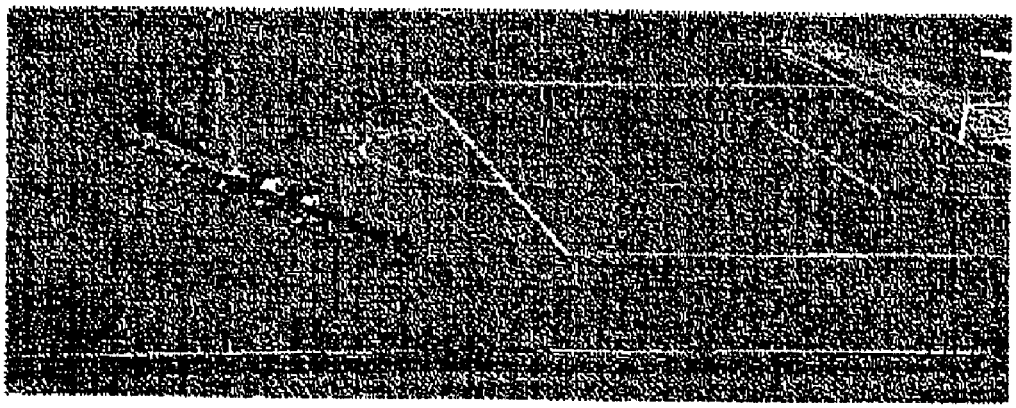
FIG. 24 is a diagram showing one more example display screen for presenting choices to a user.

(6) Available paths are displayed at the same time, and the images of players that correspond to nodes on the individual available paths are sequentially displayed in time series for each choice. This example is shown in FIG. 24.

Figure 25:
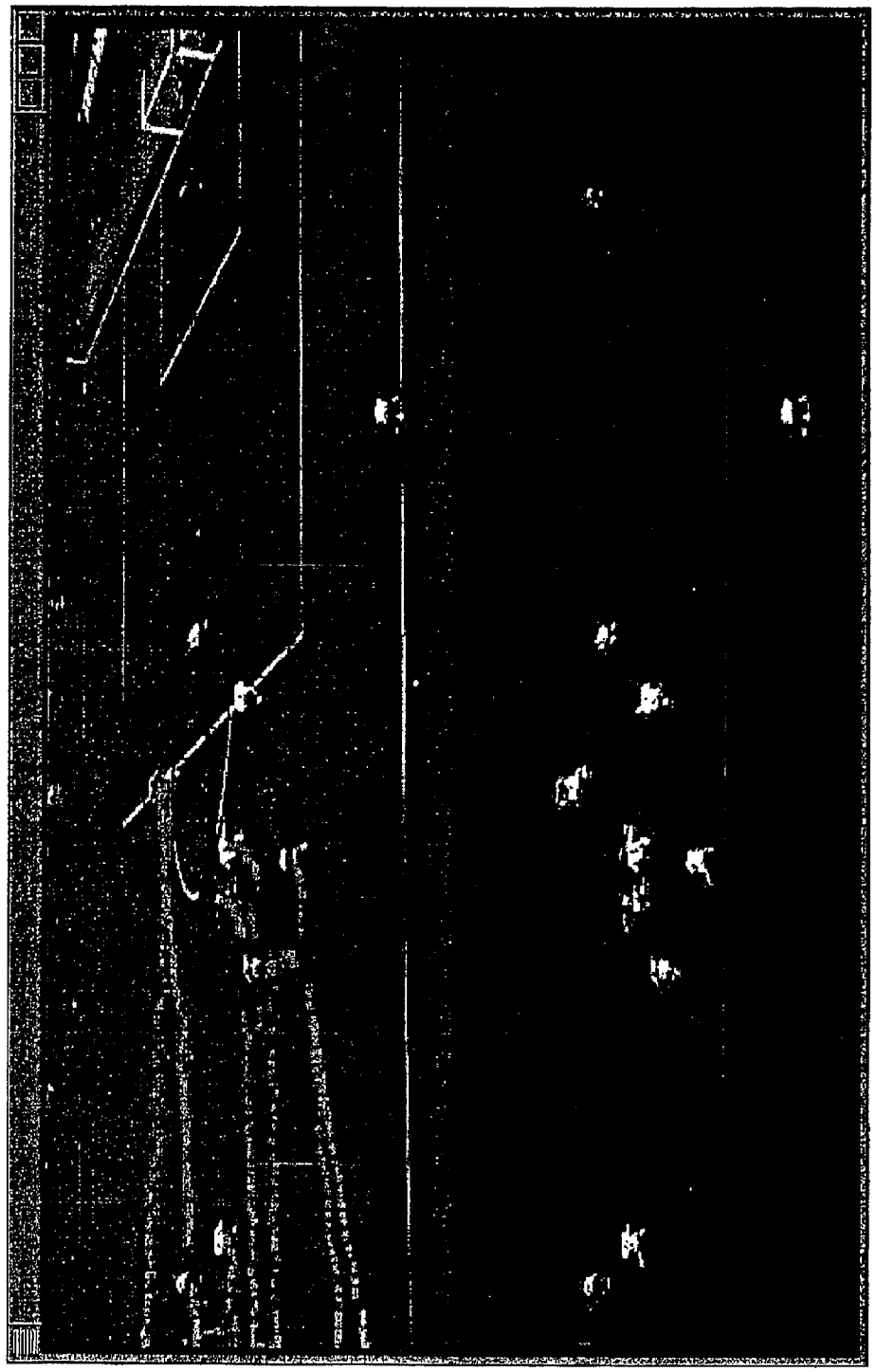
FIG. 25 is a diagram showing an example display screen.

In the above described manner, the object generation, the object tracking, and the process when the occlusion occurs can be performed. The system of the invention outputs the processing results at an arbitrary process step. In addition, various image output forms can be employed. For example, as is shown in FIG. 25, as the tracking results, the trajectory of a player that is an object can be displayed with being superimposed to a video image. It should be noted that, as is shown in the lower potion of FIG. 25, the positions of the players can be indicated as a top view.

Figure 26:
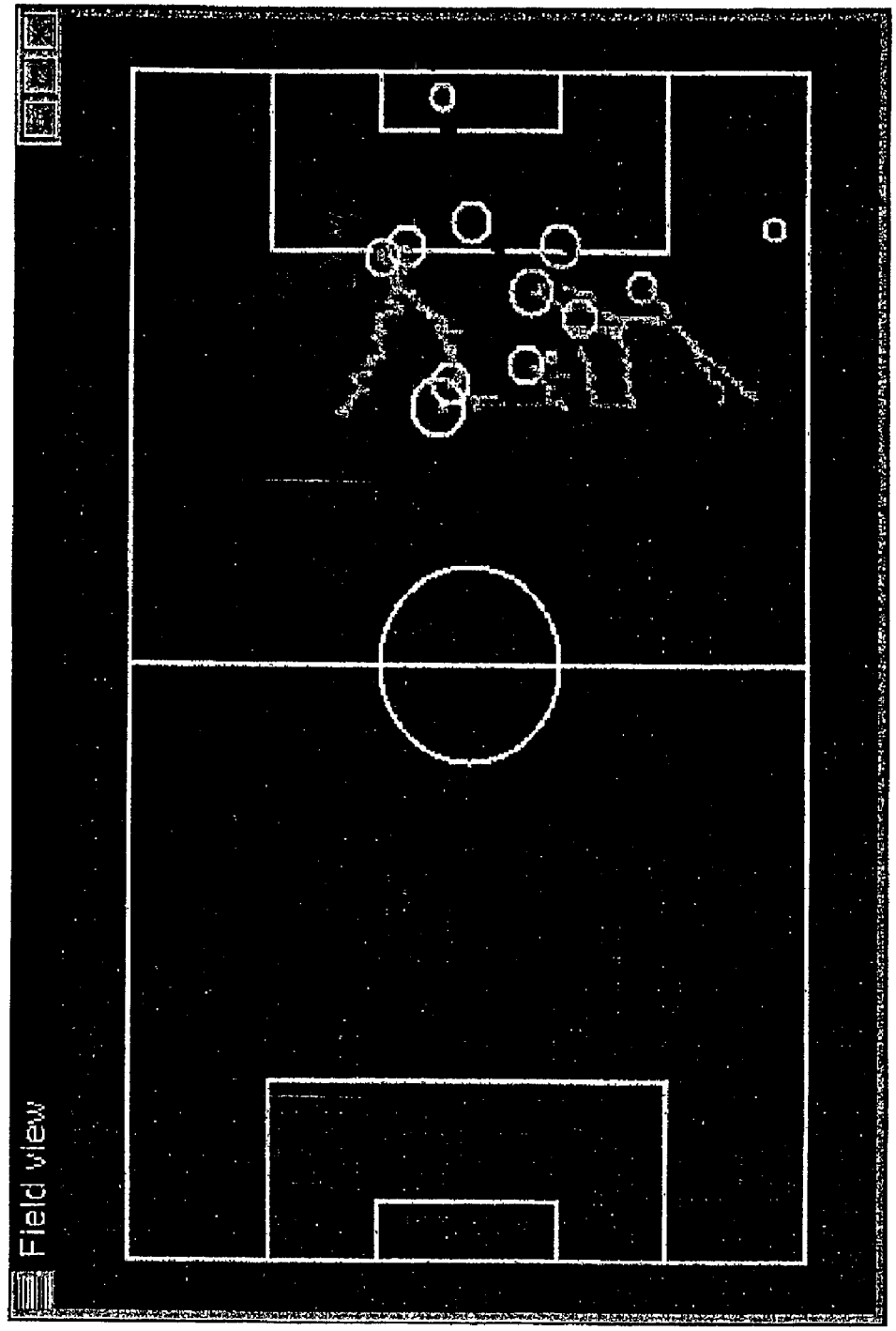
FIG. 26 is a diagram showing another example display screen.

Furthermore, as is shown in FIG. 26, the movement of a player on a soccer field can be tracked and displayed. With this display form, the movement of each player in a game is apparent, and can be used for coaching, TV relay broadcasting, etc. Further, since the present invention can be applied for image data that is recorded in a storage device, such as a hard disk, the movement of a player can be tracked and replayed, and this system can be used to discuss the strategies of sport games.

According to the system and method of the invention, an object, such as a person, having a high degree of freedom can be effectively extracted from image data. Further, since the object is tracked using a graph having a small calculation load, the calculation cost can be lowered. In addition, according to the system and method of the embodiment, the image features in the color space and the real space are employed for the edges that connect the regions (objects), and also time information is employed because the path search in time series is performed. Therefore, the correct tracking can be performed with a small calculation cost.

Further, according to the embodiment, a temporary node is generated when a region is not detected in the region generation. Thus, even when the region is missing due to the noise, this problem can be coped with. At this time, since the negative change value of the confidence factor is employed, unnecessary paths are effectively deleted. Further, when small branches occur due to the noise, the likelihood of the object is evaluated by using the confidence factor of the path, so that the object can be tracked very precisely. Further, since paths having a small confidence factor can be immediately deleted, the increase of the calculation load can be suppressed.

Furthermore, according to the embodiment, before the user is requested to select the connection of the occlusion point, the system removes in advance the connection choices that are less probable to be a path. Therefore, when the occlusion has occurred, the user can correct tracking only by the minimum selection operation.

The present invention has been specifically explained in accordance with the embodiment. However, the present invention is not limited to this embodiment, and can be variously modified without departing from the scope of the invention.

ADVANTAGE OF THE INVENTION

The typical effects obtained by the invention are as follows. A method can be provided for effectively determining the occlusion of objects, such as persons, having a high degree of freedom. The occlusion determination method can be provided without a calculation cost being required. The interactive process can be simplified, and the manual labors, the operating time and the operating load can be reduced.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after either or both of the following conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention, This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. An image processing system comprising:
    means for receiving, among multiple sets of image data that are arranged in a time series, first image data and second image data;
    means for performing segmentation for pixels of said second image data relative to an area obtained by growing said first image region;
    means for correlating a node with an image region obtained by said segmentation, for correlating said node and another node adjacent in a time series using edges, and for generating a graph.

2. The image processing system according to claim 1, wherein said means for performing segmentation for the pixels of said second image data includes:
    means for providing a label for each of said pixels; and
    means for comparing the label of a pixel with the label of a pixel adjacent to said pixel, for sorting said two pixels in the same region when said labels correspond, and for generating said image region;
    wherein said label is a Gaussian distribution function in color space;
    wherein the center value of said Gaussian distribution function is the value of a color representing said label; and
    wherein a label, which corresponds to said Gaussian distribution function that has the shortest Mahalanobis distance from said pixel in said color space, is provided for said pixel.

3. The image processing system according to claim 2, further comprising:
    means for calculating the size and the gravity center of said image region, the minimum bounding box of said image region, and another region feature that features said image region.

4. The image processing system according to claim 1, further comprising:
    means for generating a temporary node having the negative change value of a confidence factor when said image region is not generated by said segmentation for said image data.

5. The image processing system according to claim 1, further comprising:
    means for calculating the weight of said edge using a function that includes at the least either a first term, which includes the average of the absolute color differences between pixels that constitute the image regions defined by said preceding and succeeding nodes of said edges, and a second term, which provides an overlapping region that is normalized between said image regions by said preceding and succeeding nodes of said edges.

6. The image processing system according to claim 1, wherein said means for processing said graph comprises either a first structure which includes
    means for searching for a branching node, and for generating a list of paths, having a predetermined depth, before and after said branching node that is defined as a starting point,
    means for detecting paths on said path list that have the same terminal points, and means for evaluating confidence factors for said paths having the same terminal point, and for deleting a path that is smaller than a predetermined confidence factor; or a second structure which includes
- means for searching for a branching node, and for generating a list of paths, having a predetermined depth, before and after said branching node that is defined as a starting point,
- means for determining whether there is a path on said list whose terminal point is not detected by a search performed to said predetermined depth
- means for deleting, when the determination is true, branching paths other than said path whose terminal point is not detected, and means for, when the determination is false, evaluating a confidence factor for each path on said path list, and for deleting paths other than a path having the greatest confidence factor.

7. The image processing system according to claim 6, wherein said confidence factor for said path is calculated by adding, for the nodes of said path, a product of said change value of said confidence factor provided for each node of said graph and the weight provided for said edges of said graph.

8. The image processing system according to claim 1, wherein said means for processing said graph includes:
- means for generating a path search tree by performing a path search for said graph;
- means for generating a value of "1" for a path counter weight, while traversing said path search tree from the root node, when there is one child node for each node of said path search tree, or for generating a value obtained by dividing 1 by the number of child nodes when there are multiple child nodes;
- means for adding said path counter weights to generate a path counter for each node of said graph;
- means for seasoning said path counter;
- means for searching for a node whose path counter exceeds 1;
- means for determining whether the interval of adjacent nodes having the same path counter is equal to or shorter than a predetermined length; and
- means for evaluating a connection for each available input/output path when the determination is true, and for connecting input/output paths having a single significant connection when said paths are present.

9. The image processing system according to claim 1, wherein said means for processing said graph includes:
- means for obtaining a target node through a path search;
- means for determining whether said target node is at a current depth, and for, when the determination is true, adding, to a choice list, a choice for the occlusion point;
- means for determining when the depth determination is false whether the length of said choice list exceeds a predetermined threshold value, and for when the depth determination is true, presenting a choice; and
- means for clearing said choice list, for adding said target node to said choice list, and for updating the current depth when the length determination is false.

10. A computer program product comprising a computer usable medium having computer readable program code means embodied therein for causing image processing, the computer readable program code means in said computer program product comprising computer readable program code means for causing a computer to effect the functions of the system of claim 1.

11. An image processing method comprising the steps of:
receiving, among multiple sets of image data that are arranged in a time series, first image data and second image data;
performing segmentation for pixels of said second image data relative to an area obtained by growing said first image region;
correlating a node with an image region obtained by said segmentation, correlating said node and another node adjacent in a time series using edges, and generating a graph.

12. An article of manufacture comprising a computer usable medium having computer readable program code means embodied therein for causing image processing, the computer readable program code means in said article of manufacture comprising computer readable program code means for causing a computer to effect the steps of claim 11.

13. The image processing method according to claim 11, further comprising:
providing a label for each of said pixels; and
comparing the label of a pixel with the label of a pixel adjacent to said pixel, for sorting said two pixels in the same region when said labels correspond, and for generating said image region;
wherein said label is a Gaussian distribution function in color space;
wherein the center value of said Gaussian distribution function is the value of a color representing said label; and
wherein a label, which corresponds to said Gaussian distribution function that has the shortest Mahalanobis distance from said pixel in said color space, is provided for said pixel.

14. The image processing method according to claim 13, further comprising:
calculating the size and the gravity center of said image region, the minimum bounding box of said image region, and another region feature that features said image region.

15. The image processing method according to claim 11, further comprising:
generating a temporary node having the negative change value of a confidence factor when said image region is not generated by said segmentation for said image data.

16. The image processing method according to claim 11, further comprising:
calculating the weight of said edge using a function that includes at the least either a first term, which includes the average of the absolute color differences between pixels that constitute the image regions defined by said preceding and succeeding nodes of said edges, and a second term, which provides an overlapping region that is normalized between said image regions by said preceding and succeeding nodes of said edges.

17. The image processing system method according to claim 11, wherein said means for processing said graph comprises either a first structure which includes
- means for searching for a branching node, and for generating a list of paths, having a predetermined depth, before and after said branching node that is defined as a starting point,
- means for detecting paths on said path list that have the same terminal points, and
- means for evaluating confidence factors for said paths having the same terminal point, and for deleting a path that is smaller than a predetermined confidence factor; or a second structure which includes means for searching for a branching node, and for generating a list of paths, having a predetermined depth, before and after said branching node that is defined as a starting point, means for determining whether there is a path on said list whose terminal point is not detected by a search performed to said predetermined depth means for deleting, when the determination is true, branching paths other than said path whose terminal point is not detected, and means for, when the determination is false, evaluating a confidence factor for each path on said path list, and for deleting paths other than a path having the greatest confidence factor.

18. The image processing method according to claim 17, wherein said confidence factor for said path is calculated by adding, for the nodes of said path, a product of said change value of said confidence factor provided for each node of said graph and the weight provided for said edges of said graph.

19. The image processing method according to claim 11, wherein said means for processing said graph includes:

means for generating a path search tree by performing a path search for said graph;

means for generating a value of "1" for a path counter weight, while traversing said path search tree from the root node, when there is one child node for each node of said path search tree, or for generating a value obtained by dividing 1 by the number of child nodes when there are multiple child nodes;

means for adding said path counter weights to generate a path counter for each node of said graph;

means for seasoning said path counter;

means for searching for a node whose path counter exceeds 1;

means for determining whether the interval of adjacent nodes having the same path counter is equal to or shorter than a predetermined length; and means for evaluating a connection for each available input/output path when the determination is true, and for connecting input/output paths having a single significant connection when said paths are present.

20. The image processing method according to claim 11, wherein said means for processing said graph includes:

means for obtaining a target node through a path search;

means for determining whether said target node is at a current depth, and for, when the determination is true, adding, to a choice list, a choice for the occlusion point;

means for determining when the depth determination is false whether the length of said choice list exceeds a predetermined threshold value, and for when the depth determination is true, presenting a choice; and means for clearing said choice list, for adding said target node to said choice list, and for updating the current depth when the length determination is false.

* * * * *